US012629682B2

(12) United States Patent
    Frozanpoor

(10) Patent No.: US 12,629,682 B2
(45) Date of Patent: May 19, 2026

(54) CONTROL SYSTEM AND METHOD

(71) Applicant: JAGUAR LAND ROVER LIMITED, Warwickshire (GB)

(72) Inventor: Iman Frozanpoor, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 1084 days.

(21) Appl. No.: 17/596,256

(22) PCT Filed: Jun. 4, 2020

(86) PCT No.: PCT/EP2020/065493
    § 371 (c)(1),
    (2) Date: Dec. 6, 2021

(87) PCT Pub. No.: WO2020/245275
    PCT Pub. Date: Dec. 10, 2020

(65) Prior Publication Data
    US 2022/0305495 A1     Sep. 29, 2022

(30) Foreign Application Priority Data

Jun. 5, 2019    (GB) ..................................... 1907986
    Jun. 5, 2019    (GB) ..................................... 1907987
                    (Continued)

(51) Int. Cl.
    B01L 3/00          (2006.01)
    B08B 6/00          (2006.01)
                    (Continued)
(52) U.S. Cl.
    CPC ..... B01L 3/502792 (2013.01); B01L 3/50273 (2013.01); B08B 6/00 (2013.01);
                    (Continued)

(58) Field of Classification Search
    CPC ............... B01L 3/5027; B01L 3/50273; B01L 3/502784–502792; B01L 2300/0645;
                    (Continued)

(56) References Cited

U.S. PATENT DOCUMENTS 6,432,630  B1     8/2002  Blankenstein
    2003/0183525  A1    10/2003  Elrod et al.
                    (Continued)

FOREIGN PATENT DOCUMENTS

CN         103230754 A  *  8/2013
    CN         108375613 A     8/2018
                    (Continued)

OTHER PUBLICATIONS

Dey, R. et al., "Controlling shedding characteristics of condensate drops using electrowetting," Applied Physcis Letters, vol. 113, No. 24, Dec. 11, 2018, 6 pages.

(Continued)

*Primary Examiner* — James Lin
*Assistant Examiner* — Vivian A Tran
(74) *Attorney, Agent, or Firm* — McCoy Russell LLP

(57)                  ABSTRACT

Embodiments of the present disclosure provide a device for manipulating a substance, the device comprising at least three series of interdigitated electrode pairs, wherein each electrode of each pair is connected to an electrode in an adjacent pair in the respective series by an electrical path, and a dielectric layer disposed on the at least three series of interdigitated electrode pairs, the dielectric layer comprising one or more sub layers. The at least three series of interdigitated electrode pairs are selectively and independently energisable to produce an electric field at a top surface of the dielectric layer so that a substance on the top surface may be manipulated by the electric field.

20 Claims, 19 Drawing Sheets

(30) Foreign Application Priority Data

| Jun. 4, 2020 | (GB) | ....................................... | 2008391 |
| Jun. 4, 2020 | (GB) | ....................................... | 2008392 |

(51) Int. Cl.

| *B08B 7/00* | (2006.01) |
| *B60S 1/02* | (2006.01) |
| *F04B 19/20* | (2006.01) |

(52) U.S. Cl.

CPC .............. *B08B 7/0071* (2013.01); *B60S 1/02* (2013.01); *F04B 19/20* (2013.01); *B01L 2300/0645* (2013.01); *B01L 2300/161* (2013.01); *B01L 2300/168* (2013.01); *B01L 2400/0427* (2013.01)

(58) Field of Classification Search

CPC ......... B01L 2300/161; B01L 2300/168; B01L 2400/0424–0427; B08B 6/00; B08B 7/0071; B60S 1/00–026

See application file for complete search history.

(56) References Cited

U.S. PATENT DOCUMENTS

| 2006/0246431 A1 | 11/2006 | Balachandran |
| 2007/0207548 A1 | 9/2007 | Blankenstein |
| 2008/0135411 A1 | 6/2008 | Whitehead et al. |
| 2009/0038938 A1 | 2/2009 | Mezic et al. |
| 2011/0005931 A1 | 1/2011 | Zhe et al. |
| 2012/0180978 A1 | 7/2012 | Gavillet et al. |
| 2014/0061049 A1 | 3/2014 | Lo et al. | |
| 2019/0204262 A1* | 7/2019 | Pang | ...................... G01N 27/27 |
| 2019/0314820 A1* | 10/2019 | Geng | ............... G01N 27/44769 |

FOREIGN PATENT DOCUMENTS

| CN | 109154583 A | 1/2019 |
| EP | 3460460 A2 | 3/2019 |
| KR | 20180033475 A | 4/2018 |
| KR | 20180043080 A | 4/2018 |
| WO | 2013028573 A1 | 2/2013 |
| WO | 2018106750 A1 | 6/2018 |

OTHER PUBLICATIONS

Great Britain Intellectual Property Office, Combined Search and Examination Report under Sections 17 and 18(3) Issued in Application No. GB1907987.0, Dec. 27, 2019, 7 pages.

Great Britain Intellectual Property Office, Combined Search and Examination Report under Sections 17 and 18(3) Issued in Application No. GB2008391.1, Dec. 1, 2020, 6 pages.

Great Britain Intellectual Property Office, Combined Search and Examination Report under Sections 17 and 18(3) Issued in Application No. GB2008392.9, Dec. 8, 2020, 6 pages.

China National Intellectual Property Administration, Office Action and Search Report Issued in Application No. 202080041679.2, May 30, 2023, 19 pages.

Great Britain Intellectual Property Office, Combined Search and Examination Report under Sections 17 and 18(3) Issued in Application No. GB1907986.2, Dec. 24, 2019, 5 pages.

SA European Patent Office, International Search Report and Written Opinion Issued in Application No. PCT/EP2020/065493, Sep. 4, 2020, WIPO, 15 pages.

* cited by examiner

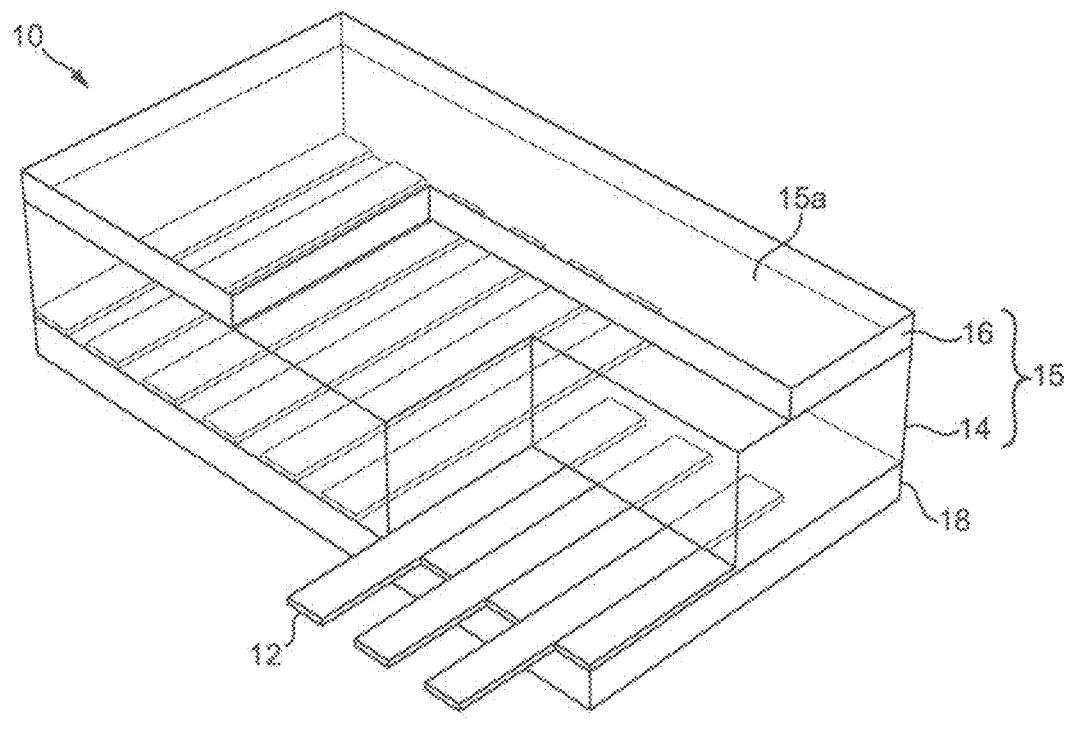
FIG. 1
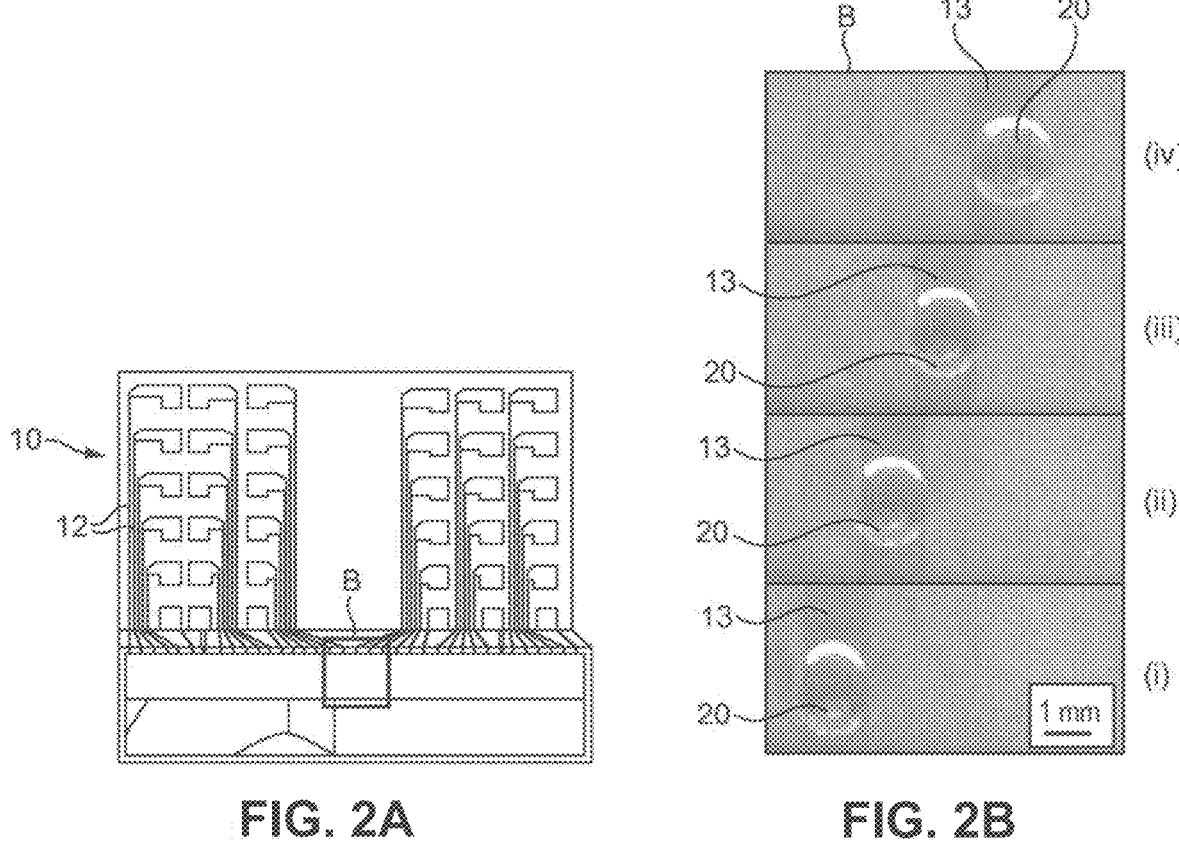
FIG. 2A    FIG. 2B

| Pattern | Length (L) ~ mm | Electrode gap ($d_{min}$) ~µm | Electrode gap ($d_{max}$) ~ µm |
|---|---|---|---|
| One | 10 | 20 | 400 |
| Two | 10 | 20 | 200 |
| Three | 5 | 20 | 400 |
| Four | 5 | 20 | 200 |

1010

1040

1010

1020    1020    1020

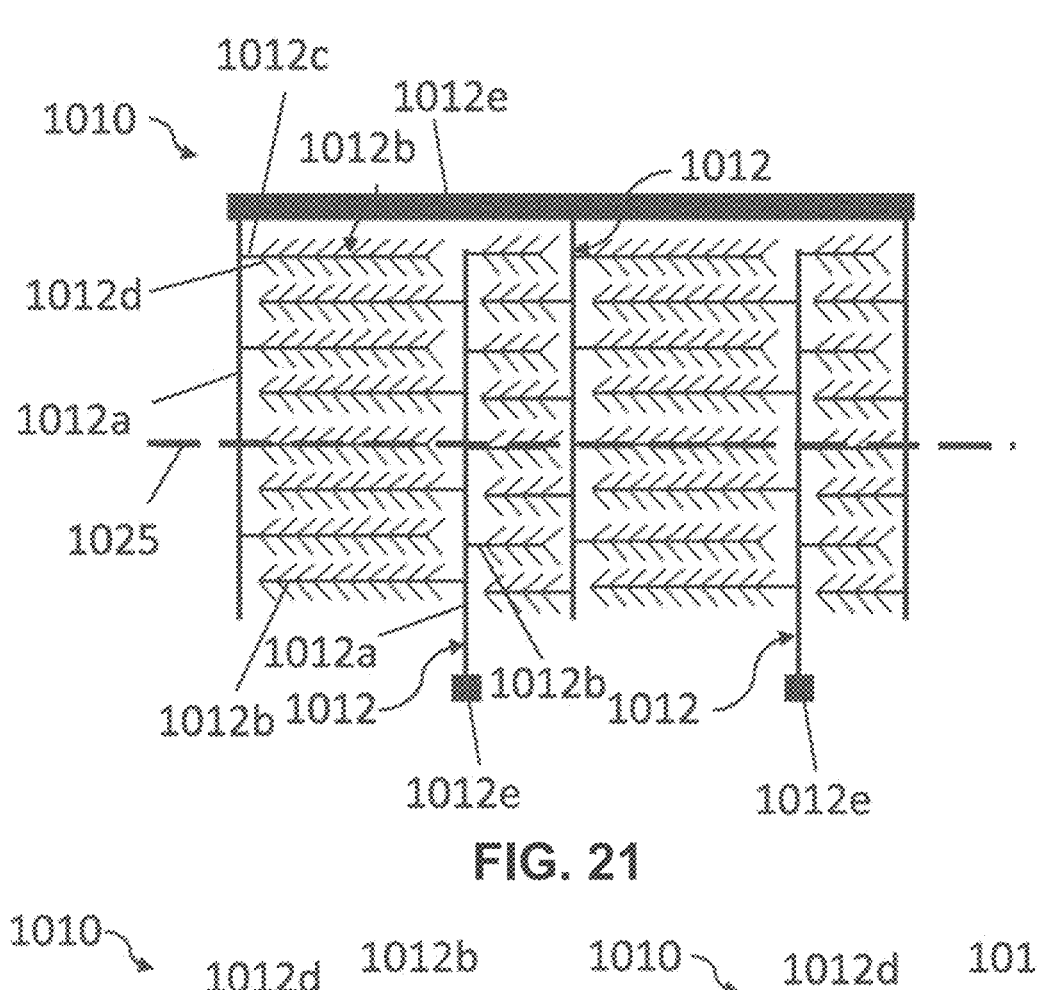
FIG. 21
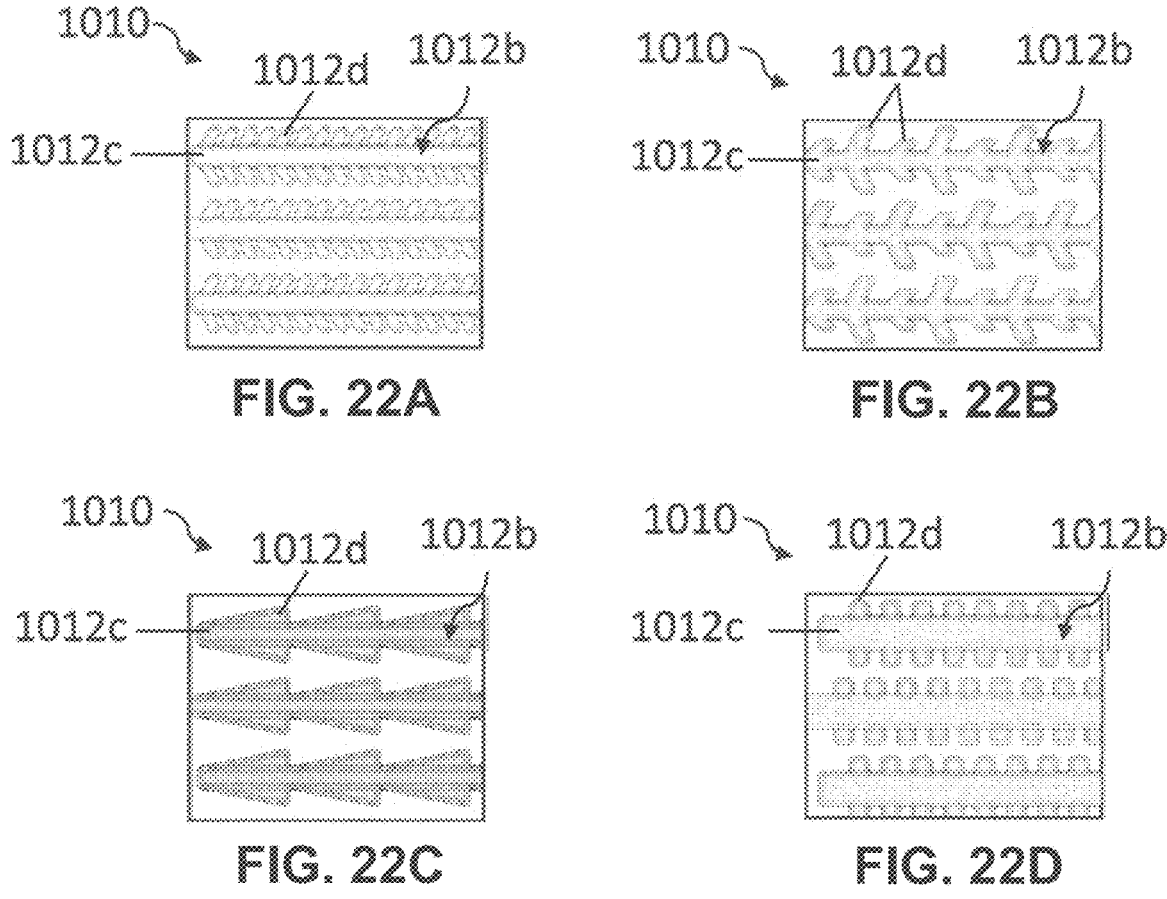
FIG. 22A
FIG. 22B
FIG. 22C
FIG. 22D

CONTROL SYSTEM AND METHOD

CROSS REFERENCE TO RELATED APPLICATIONS

The present application is a U.S. National Phase of International Application No. PCT/EP2020/065493 entitled "DEVICE FOR MANIPULATING A SUBSTANCE, VEHICLE AND ASSEMBLY COMPRISING THE SAME, AND METHOD OF USING THE DEVICE," and filed on Jun. 4, 2020. International Application No. PCT/EP2020/065493 claims priority to Great Britain Patent Application No. 1907986.2 filed on Jun. 5, 2019, to Great Britain Patent Application No. 1907987.0 filed on Jun. 5, 2019, to Great Britain Patent Application No. 2008391.1 filed on Jun. 4, 2020, and to Great Britain Patent Application No. 2008392.9 filed on Jun. 4, 2020. The entire contents of each of the above-listed applications are hereby incorporated by reference for all purposes.

TECHNICAL FIELD

The present disclosure relates to a device for manipulating a substance and particularly, but not exclusively, where the substance is a droplet or a solid. Aspects of the disclosure relate to a device for manipulating a substance, to a vehicle that includes the device, to an assembly that includes the device, and to a method of using a device for manipulating a substance.

BACKGROUND AND SUMMARY

The two conventional methods of electrically controlling a droplet on a surface are known as electrowetting and dielectrowetting. Although electrowetting has been predominantly studied for numerous applications, the technology is restricted by a range of practical constraints. Dielectrowetting, on the other hand, has been gaining considerable attention for overcoming the limitations of electrowetting. Dielectrowetting is based on liquid dielectrophoresis (L-DEP), which is a bulk force generated when a non-uniform electric field interacts with the electric dipoles within a liquid. It is known that dielectrowetting can overcome the contact angle saturation limitation associated with electrowetting in order to spread droplets into a thin liquid film. It is also known that there is a relationship between the change of contact angle at a solid-liquid interface (e.g. a droplet on a surface) and the voltage applied. The actuation of sessile droplets using L-DEP can be explained through asymmetric electrostatic forces changing the contact angle on one side of the droplet, thus causing motion.

However, there are certain drawbacks associated with existing prior art techniques. Firstly, very high voltages (e.g. in excess of 360 V) are required to sufficiently change the contact angle, thus precluding the application of the technology to devices where such high voltages would not be possible or practical. Secondly, prior art studies demonstrating how droplets have been moved across a surface have been reliant on knowledge of the volume of the droplets (e.g. requiring feedback) in order to select the operating parameters required to move the droplets. Thus, such technology is not suitable for the manipulation of droplets of unknown volume.

It is an object of embodiments of the disclosure to at least mitigate one or more of the problems of the prior art.

Aspects of the disclosure relate to a controller, to an apparatus comprising the controller, to a vehicle and to a method.

In accordance with an aspect of the disclosure, there is provided a controller for performing a method of manipulating a substance on a surface adjacent a plurality of electrode pairs, the controller being arranged to iteratively perform until a predetermined first condition is met:

(a) a mth cycle comprising iteratively energising a nth subset of the plurality of electrode pairs in a nth step and a n=n+1th step until a predetermined second condition is met;

wherein in the n=n+1th step (i) electrode pairs of the n=n+1th subset are adjacent to electrode pairs of the nth subset, and (ii) the n=n+1th subset comprises the same number of electrode pairs as the nth subset; and (b) a m=m+1th cycle that is identical to the mth cycle except wherein in the m=m+1th cycle each subset comprises a different number of electrode pairs than each subset in the mth cycle;

wherein the droplet is manipulated on the surface by an electric field created by energised subsets of the plurality of electrode pairs.

The method may facilitate manipulation of a substance on a surface adjacent a plurality of electrode pairs without requiring feedback in order to select the operating parameters required to manipulate the substance (e.g. move droplets).

In certain embodiments, in the n+1th step, none of the nth subset is energised.

In certain embodiments, each subset may comprise at least one pair of interdigitated electrodes. In an initial mth cycle, each subset may comprise a single pair of interdigitated electrodes. Each interdigitated electrode pair may intersect a common longitudinal axis.

In certain embodiments, in the m+1th cycle, each subset may comprise one more electrode pair than each subset in the mth cycle.

In certain embodiments, the mth cycle may terminate when a n+1th subset is energised and n+1 is equal to 3.

In certain embodiments, the method performed by the controller may terminate when a m+1th cycle is performed and m+1 is equal to 4.

In certain embodiments, manipulating a substance on a surface adjacent a plurality of electrode pairs may comprise moving a droplet across the surface.

In certain embodiments, energising electrode pairs may comprise energising electrode pairs using a voltage of 100 V or less, 50 V or less, or 20 V or less.

The controller may be arranged to selectively energise the electrode pairs at a frequency selected from a plurality of possible frequencies. In certain embodiments, the controller may be arranged to be additionally selectively operable in a heating mode in which the electrode pairs are selectively energisable at a frequency that causes a substance on the surface to be heated.

In accordance with another aspect of the present disclosure, there is provided an apparatus comprising a controller as described above and a device coupled to the controller, the device comprising:

a plurality of interdigitated electrode pairs;

a dielectric layer disposed on the plurality of interdigitated electrode pairs, the dielectric layer comprising one or more sub layers;

wherein the plurality of interdigitated electrode pairs are selectively energisable by the controller and a first electrode of each interdigitated electrode pair is spaced from a second electrode of the interdigitated electrode pair by 100 μm or less; and wherein the dielectric layer has a thickness and composition such that an electric field at a top surface of the dielectric layer is at least $2\times10^6$ V/m when the plurality of interdigitated electrode pairs are selectively energized by a voltage of 100V or less; and wherein a droplet on the top surface may be manipulated by the electric field.

The dielectric layer may have a thickness and composition such that an electric field at a top surface of the dielectric layer is at least $2\times10^6$ V/m when the plurality of interdigitated electrode pairs are selectively energized by a voltage of 50 V or less, or 30 V or less.

The dielectric layer may have a thickness and composition such that an electric field at a top surface of the dielectric layer is at least $2\times10^7$ V/m when the plurality of interdigitated electrode pairs are selectively energized by a voltage of 100 V or less, 50 V or less, or 30 V or less.

In certain embodiments, the dielectric layer may have a thickness less than 1 μm, less than 500 nm, between 400 nm and 500 nm, or about 450 nm.

In accordance with another aspect of the present disclosure, there is provided a vehicle comprising the controller described above.

In accordance with another aspect of the present disclosure, there is provided a method of manipulating a substance on a surface adjacent a plurality of electrode pairs comprising iteratively performing:

(a) a mth cycle comprising iteratively energising a nth subset of the plurality of electrode pairs in a nth step and a n=n+1th step until a predetermined second condition is met;

wherein in the n=n+1th step (i) electrode pairs of the n=n+1th subset are adjacent to electrode pairs of the nth subset, and (ii) the n=n+1th subset comprises the same number of electrode pairs as the nth subset; and (b) a m=m+1th cycle that is identical to the mth cycle except wherein in the m=m+1th cycle each subset comprises a different number of electrode pairs than each subset in the mth cycle;

wherein the substance is manipulated on the surface by an electric field created by energised subsets of the plurality of electrode pairs.

In accordance with another aspect of the present disclosure, there is provided a device for manipulating a substance, the device comprising:

a plurality of interdigitated electrode pairs; and a dielectric layer disposed on the plurality of interdigitated electrode pairs, the dielectric layer comprising one or more sub layers;

wherein the plurality of interdigitated electrode pairs are selectively energisable and a first electrode of each interdigitated electrode pair is spaced from a second electrode of the interdigitated electrode pair by 100 μm or less; and wherein the dielectric layer has a thickness and composition such that an electric field at a top surface of the dielectric layer is at least $2\times10^6$ V/m when the plurality of interdigitated electrode pairs are selectively energized by a voltage of 100V or less; and wherein a substance on the top surface may be manipulated by the electric field.

Such a device may facilitate manipulation of a substance, such as a droplet or a solid, using a low operating voltage when compared to prior art devices.

In certain embodiments, the dielectric layer may have a thickness and composition such that an electric field at a top surface of the dielectric layer is at least $2\times10^6$ V/m when the plurality of interdigitated electrode pairs are selectively energized by a voltage of 50 V or less, or 30 V or less.

In certain embodiments, the dielectric layer may have a thickness and composition such that an electric field at a top surface of the dielectric layer is at least $2\times10^7$ V/m when the plurality of interdigitated electrode pairs are selectively energized by a voltage of 100 V or less, 50 V or less, or 30 V or less. Such an electric field is effective at manipulating a substance on the top surface.

In certain embodiments, the dielectric layer may have a thickness less than 1 μm, less than 500 nm, between 400 nm and 500 nm, or about 450 nm.

The dielectric layer may include a sub layer comprising photosensitive epoxy resin. In certain embodiments, the photosensitive epoxy resin may comprise SU8 photoresist.

In certain embodiments, the dielectric layer may include a sub layer comprising a hydrophobic material. The hydrophobic material may comprise a hydrophobic self-assembled monolayer, which, in certain embodiments, may comprise octadecyltrichlorosilane (OTS).

Additionally or alternatively, the dielectric layer may include a top sub layer comprising a lubricant (e.g. an oil-based lubricant).

In certain embodiments, each of the first and second electrodes of each interdigitated electrode pair may comprise a root, a plurality of branches that extend from the root, and a plurality of sub-branches that extend from the branches. Such an arrangement may serve to enhance the local electric fields generated by the electrodes In certain embodiments, the plurality of branches of the first electrode of each interdigitated electrode pair may be interdigitated with the plurality of branches of the second electrode of the interdigitated electrode pair. The root of the first electrode of each interdigitated electrode pair may be substantially parallel to the root of the second electrode of the interdigitated electrode pair. The plurality of branches may extend substantially perpendicularly from the respective root. In certain embodiments, the plurality of sub-branches may extend substantially perpendicularly from the respective plurality of branches. Each of the plurality of sub-branches of the first electrode of each interdigitated electrode pair may have a longitudinal axis that is not coincident with a longitudinal axis of each of the plurality of sub-branches of the second electrode of the interdigitated electrode pair.

In certain embodiments, the plurality of sub-branches may extend from the respective plurality of branches at an inclined angle that is not 90°.

In certain embodiments, the plurality of sub-branches of each of the first and second electrodes of each interdigitated electrode pair may be substantially wedge-shaped.

In certain embodiments, the plurality of sub-branches of each of the first and second electrodes of each interdigitated electrode pair may comprise a first set of sub-branches and a second set of sub-branches, where the first set of sub-branches is not identical to the second set of sub-branches. The first set of sub-branches may extend from the respective branch by a different amount relative to the second set of sub-branches.

In certain embodiments, the device may comprise a substrate layer upon which the plurality of interdigitated electrode pairs are disposed. In certain embodiments, the substrate may be flexible.

In certain embodiments, the device may comprise a controller arranged to selectively energise the plurality of interdigitated electrode pairs.

In accordance with another aspect of the disclosure, there is provided a vehicle comprising one or more devices as described above.

In accordance with another aspect of the disclosure, there is provided an assembly comprising a substantially translucent material having one or more devices as described above embedded therein or affixed thereto. In certain embodiments, the substantially translucent material may comprise a vehicle windscreen or an optical component.

In accordance with another aspect of the present disclosure, there is provided a device for manipulating a substance, the device comprising:

a plurality of interdigitated electrode pairs; and a dielectric layer disposed on the plurality of interdigitated electrode pairs, the dielectric layer comprising one or more sub layers;

wherein the plurality of interdigitated electrode pairs are selectively energisable and a first electrode of each interdigitated electrode pair is spaced from a second electrode of the interdigitated electrode pair by 100 μm or less; and wherein the dielectric layer has a thickness and composition such that an electric field at a top surface of the dielectric layer is at least $2\times10^6$ V/m when the plurality of interdigitated electrode pairs are selectively energized by a voltage of 100V or less; and wherein a substance on the top surface may be manipulated by the electric field.

Such a device may facilitate manipulation of a substance, such as a droplet or a solid, using a low operating voltage when compared to prior art devices.

In certain embodiments, the dielectric layer may have a thickness and composition such that an electric field at a top surface of the dielectric layer is at least $2\times10^6$ V/m when the plurality of interdigitated electrode pairs are selectively energized by a voltage of 50 V or less, or 30 V or less.

In certain embodiments, the dielectric layer may have a thickness and composition such that an electric field at a top surface of the dielectric layer is at least $1\times10^7$ V/m when the plurality of interdigitated electrode pairs are selectively energized by a voltage of 100 V or less, 50 V or less, or 30 V or less. Such an electric field is effective at manipulating a substance on the top surface.

In certain embodiments, the dielectric layer may have a thickness less than 1 μm, less than 500 nm, between 400 nm and 500 nm, or about 450 nm.

The dielectric layer may include a sub layer comprising photosensitive epoxy resin. In certain embodiments, the photosensitive epoxy resin may comprise SU8 photoresist.

In certain embodiments, the dielectric layer may include a sub layer comprising a hydrophobic material. The hydrophobic material may comprise a hydrophobic self-assembled monolayer, which, in certain embodiments, may comprise octadecyltrichlorosilane (OTS).

Additionally or alternatively, the dielectric layer may include a top sub layer comprising a lubricant (e.g. an oil-based lubricant).

In certain embodiments, each of the first and second electrodes of each interdigitated electrode pair may comprise a root, a plurality of branches that extend from the root, and a plurality of sub-branches that extend from the branches. Such an arrangement may serve to enhance the local electric fields generated by the electrodes In certain embodiments, the plurality of branches of the first electrode of each interdigitated electrode pair may be interdigitated with the plurality of branches of the second electrode of the interdigitated electrode pair. The root of the first electrode of each interdigitated electrode pair may be substantially parallel to the root of the second electrode of the interdigitated electrode pair. The plurality of branches may extend substantially perpendicularly from the respective root. In certain embodiments, the plurality of sub-branches may extend substantially perpendicularly from the respective plurality of branches. Each of the plurality of sub-branches of the first electrode of each interdigitated electrode pair may have a longitudinal axis that is not coincident with a longitudinal axis of each of the plurality of sub-branches of the second electrode of the interdigitated electrode pair.

In certain embodiments, the plurality of sub-branches may extend from the respective plurality of branches at an inclined angle that is not 90°.

In certain embodiments, the plurality of sub-branches of each of the first and second electrodes of each interdigitated electrode pair may be substantially wedge-shaped.

In certain embodiments, the plurality of sub-branches of each of the first and second electrodes of each interdigitated electrode pair may comprise a first set of sub-branches and a second set of sub-branches, where the first set of sub-branches is not identical to the second set of sub-branches. The first set of sub-branches may extend from the respective branch by a different amount relative to the second set of sub-branches.

In certain embodiments, the device may comprise a substrate layer upon which the plurality of interdigitated electrode pairs are disposed. In certain embodiments, the substrate may be flexible.

In certain embodiments, the device may comprise a controller arranged to selectively energise the plurality of interdigitated electrode pairs.

In accordance with another aspect of the disclosure, there is provided a vehicle comprising one or more devices as described above.

In accordance with another aspect of the disclosure, there is provided an assembly comprising a substantially translucent material having one or more devices as described above embedded therein or affixed thereto. In certain embodiments, the substantially translucent material may comprise a vehicle windscreen or an optical component.

In accordance with an aspect of the disclosure, there is provided a controller for performing a method of manipulating a substance on a surface adjacent a plurality of electrode pairs, the controller being arranged to iteratively perform until a predetermined first condition is met:

(a) a mth cycle comprising iteratively energising a nth subset of the plurality of electrode pairs in a nth step and a n=n+1th step until a predetermined second condition is met;

wherein in the n=n+1th step (i) electrode pairs of the n=n+1th subset are adjacent to electrode pairs of the nth subset, and (ii) the n=n+1th subset comprises the same number of electrode pairs as the nth subset; and (b) a m=m+1th cycle that is identical to the mth cycle except wherein in the m=m+1th cycle each subset comprises a different number of electrode pairs than each subset in the mth cycle;

wherein the droplet is manipulated on the surface by an electric field created by energised subsets of the plurality of electrode pairs.

The method may facilitate manipulation of a substance on a surface adjacent a plurality of electrode pairs without requiring feedback in order to select the operating parameters required to manipulate the substance (e.g. move droplets).

In certain embodiments, in the n+1th step, none of the nth subset is energised.

In certain embodiments, each subset may comprise at least one pair of interdigitated electrodes. In an initial mth cycle, each subset may comprise a single pair of interdigitated electrodes. Each interdigitated electrode pair may intersect a common longitudinal axis.

In certain embodiments, in the m+1th cycle, each subset may comprise one more electrode pair than each subset in the mth cycle.

In certain embodiments, the mth cycle may terminate when a n+1th subset is energised and n+1 is equal to 3.

In certain embodiments, the method performed by the controller may terminate when a m+1th cycle is performed and m+1 is equal to 4.

In certain embodiments, manipulating a substance on a surface adjacent a plurality of electrode pairs may comprise moving a droplet across the surface.

In certain embodiments, energising electrode pairs may comprise energising electrode pairs using a voltage of 100 V or less, 50 V or less, or 20 V or less.

The controller may be arranged to selectively energise the electrode pairs at a frequency selected from a plurality of possible frequencies. In certain embodiments, the controller may be arranged to be additionally selectively operable in a heating mode in which the electrode pairs are selectively energisable at a frequency that causes a substance on the surface to be heated.

In accordance with another aspect of the present disclosure, there is provided an apparatus comprising a controller as described above and a device coupled to the controller, the device comprising:

a plurality of interdigitated electrode pairs;
  a dielectric layer disposed on the plurality of interdigitated electrode pairs, the dielectric layer comprising one or more sub layers;
  wherein the plurality of interdigitated electrode pairs are selectively energisable by the controller and a first electrode of each interdigitated electrode pair is spaced from a second electrode of the interdigitated electrode pair by 100 $\mu$m or less; and
  wherein the dielectric layer has a thickness and composition such that an electric field at a top surface of the dielectric layer is at least $2\times10^6$ V/m when the plurality of interdigitated electrode pairs are selectively energized by a voltage of 100V or less; and
  wherein a droplet on the top surface may be manipulated by the electric field.

The dielectric layer may have a thickness and composition such that an electric field at a top surface of the dielectric layer is at least $2\times10^6$ V/m when the plurality of interdigitated electrode pairs are selectively energized by a voltage of 50 V or less, or 30 V or less.

The dielectric layer may have a thickness and composition such that an electric field at a top surface of the dielectric layer is at least $1\times10^7$ V/m when the plurality of interdigitated electrode pairs are selectively energized by a voltage of 100 V or less, 50 V or less, or 30 V or less.

In certain embodiments, the dielectric layer may have a thickness less than 1 $\mu$m, less than 500 nm, between 400 nm and 500 nm, or about 450 nm.

In accordance with another aspect of the present disclosure, there is provided a vehicle comprising the controller described above.

In accordance with another aspect of the present disclosure, there is provided a method of manipulating a substance on a surface adjacent a plurality of electrode pairs comprising iteratively performing:

(a) a mth cycle comprising iteratively energising a nth subset of the plurality of electrode pairs in a nth step and a n=n+1th step until a predetermined second condition is met;
  wherein in the n=n+1th step (i) electrode pairs of the n=n+1th subset are adjacent to electrode pairs of the nth subset, and (ii) the n=n+1th subset comprises the same number of electrode pairs as the nth subset; and
  (b) a m=m+1th cycle that is identical to the mth cycle except wherein in the m=m+1th cycle each subset comprises a different number of electrode pairs than each subset in the mth cycle;
  wherein the substance is manipulated on the surface by an electric field created by energised subsets of the plurality of electrode pairs.

In accordance with an aspect of the present disclosure, there is provided a device for manipulating a substance, the device comprising:

one or more interdigitated electrode pairs, each electrode of each of the one or more interdigitated electrode pairs comprising a root and a plurality of branches that each extend from the root along a respective longitudinal axis, wherein the plurality of branches of one electrode of the pair are interdigitated with the plurality of branches of the other electrode of the pair; and
  a dielectric layer disposed on the one or more interdigitated electrode pairs, the dielectric layer comprising one or more sub layers;
  wherein the one or more interdigitated electrode pairs are energisable to produce an electric field at a top surface of the dielectric layer so that a substance on the top surface may be manipulated by the electric field; and
  wherein adjacent branches of each of the one or more interdigitated electrode pairs are spaced from one another in a direction that is perpendicular to the respective longitudinal axis of one of the adjacent branches, and the spacing varies along a direction parallel to that respective longitudinal axis.

In certain embodiments, the spacing decreases along the direction parallel to the longitudinal axis. The spacing may decrease at a substantially constant rate along the direction parallel to the longitudinal axis. In certain embodiments, the spacing may decrease by an amount between 150 $\mu$m and 500 $\mu$m, and optionally between 150 $\mu$m and 250 $\mu$m.

In certain embodiments, each branch may comprise a main branch and a plurality of sub-branches extending from the main branch.

In certain embodiments, the dielectric layer may have a thickness and composition such that an electric field at a top surface of the dielectric layer is at least $2\times10^6$ V/m when the interdigitated electrode pairs are selectively energized by a voltage of 100 V or less, 50 V or less, or 30 V or less.

In certain embodiments, the dielectric layer may have a thickness and composition such that an electric field at a top surface of the dielectric layer is between $2\times10^6$ V/m and $1 \times 10^7$ V/m when the interdigitated electrode pairs are selectively energized by a voltage of 100 V or less, 50 V or less, or 30 V or less.

In certain embodiments, the dielectric layer may have a thickness and composition such that an electric field at a top surface of the dielectric layer is at least $1 \times 10^7$ V/m when the plurality of interdigitated electrode pairs are selectively energized by a voltage of 100 V or less, 50 V or less, or 30 V or less.

In certain embodiments, the dielectric layer may have a thickness less than 1 µm, less than 500 nm, between 400 nm and 500 nm, or about 450 nm.

In certain embodiments, the dielectric layer may include a sub layer comprising photosensitive epoxy resin. The photosensitive epoxy resin may comprise SU8 photoresist.

In certain embodiments, the dielectric layer may include a sub layer comprising a hydrophobic material. The hydrophobic material may comprise a hydrophobic self-assembled monolayer. The hydrophobic self-assembled monolayer may comprise octadecyltrichlorosilane (OTS).

In certain embodiments, the dielectric layer may include a top sub layer comprising a lubricant.

In certain embodiments, the device may comprise a substrate layer upon which the plurality of interdigitated electrode pairs are disposed. The substrate may be flexible.

In certain embodiments, each branch of each pair may have a length that is 15 mm or less, 10 mm or less, or 5 mm or less.

In certain embodiments, the device may comprise at least three series of interdigitated electrode pairs;

wherein each electrode of each pair is connected to an electrode in an adjacent pair in the respective series by an electrical path; and wherein the at least three series of interdigitated electrode pairs are selectively and independently energisable to produce the electric field at a top surface of the dielectric layer so that a substance on the top surface may be manipulated by the electric field;

the device may further comprise one or more groups of the interdigitated electrode pairs, each group having a longitudinal axis, wherein in each group the respective interdigitated electrode pairs are arranged along the respective longitudinal axis of the group such that along the respective longitudinal axis of the group no two adjacent pairs are from a single one of the at least three series, and no pair is adjacent to two other pairs from a single one of the at least three series.

The at least three series of interdigitated electrode pairs may consist of only three series of interdigitated electrode pairs. The device may comprise a plurality of groups wherein the longitudinal axes of at least some of the plurality of groups radiate out from a common point. Consecutive arrays of interdigitated electrode pairs along each longitudinal axis may increase in size in a direction away from the common point. The lengths of the consecutive arrays of interdigitated electrode pairs may increase in size in a direction away from the common point. The widths of the consecutive arrays of interdigitated electrode pairs may increase in size in a direction away from the common point. In certain embodiments, all of the interdigitated electrode pairs and electrical paths may be in the same plane as one another.

In certain embodiments, one electrode of each pair is connected to a common ground terminal.

In accordance with an aspect of the present disclosure, there is provided a vehicle comprising one or more devices as described above.

In accordance with an aspect of the present disclosure, there is provided an assembly comprising a substantially translucent material having one or more devices as described above embedded therein or affixed thereto, wherein optionally the substantially translucent material comprises a vehicle windscreen or an optical component.

In accordance with an aspect of the present disclosure, there is provided a method of using a device as described above, comprising energising the one or more interdigitated electrode pairs to produce an electric field at a top surface of the dielectric layer so that a substance on the top surface may be manipulated by the electric field.

Energising the at least three series of interdigitated electrode pairs may comprise applying an AC voltage across each of the one or more interdigitated electrode pairs.

In certain embodiments, the AC voltage may have a frequency of 250 kHz or less, and optionally between 0.1 kHz and 2.5 kHz In accordance with an aspect of the present disclosure, there is provided a device for manipulating a substance, the device comprising:

at least three series of interdigitated electrode pairs, wherein each electrode of each pair is connected to an electrode in an adjacent pair in the respective series by an electrical path; and a dielectric layer disposed on the at least three series of interdigitated electrode pairs, the dielectric layer comprising one or more sub layers;

wherein the at least three series of interdigitated electrode pairs are selectively and independently energisable to produce an electric field at a top surface of the dielectric layer so that a substance on the top surface may be manipulated by the electric field;

the device further comprising one or more groups of the interdigitated electrode pairs, each group having a longitudinal axis, wherein in each group the respective interdigitated electrode pairs are arranged along the respective longitudinal axis such that along the respective longitudinal axis no two adjacent pairs are from a single one of the at least three series, and no pair is adjacent to two other pairs from a single one of the at least three series.

The at least three series of interdigitated electrode pairs may consist of only three series of interdigitated electrode pairs. Each electrode of each pair may have a length that is 15 mm or less, 10 mm or less, or 5 mm or less.

The device may comprise a plurality of groups wherein the longitudinal axes of at least some of the plurality of groups radiate out from a common point. Consecutive interdigitated electrode pairs along each longitudinal axis may increase in size in a direction away from the common point. The lengths of the consecutive interdigitated electrode pairs may increase in size in a direction away from the common point. The widths of the consecutive interdigitated electrode pairs may increase in size in a direction away from the common point.

In certain embodiments, all of the interdigitated electrode pairs and electrical paths are in the same plane as one another.

In certain embodiments, one electrode of each pair is connected to a common ground terminal.

In certain embodiments, each electrode of each of the one or more interdigitated electrode pairs comprises a root and a plurality of branches that each extend from the root along a respective longitudinal axis, wherein the plurality of branches of one electrode of the pair are interdigitated with the plurality of branches of the other electrode of the pair;

wherein adjacent branches of each of the interdigitated electrode pairs are spaced from one another in a direction that is perpendicular to the respective longitudinal axis of one of the adjacent branches, and the spacing varies along a direction parallel to that respective longitudinal axis.

The spacing may decrease along the direction parallel to the respective longitudinal axis. The spacing may decrease at a substantially constant rate along the direction parallel to the respective longitudinal axis. The spacing may decrease by an amount between 150 µm and 500 µm, and optionally between 150 µm and 250 µm.

In certain embodiments, the dielectric layer has a thickness and composition such that an electric field at a top surface of the dielectric layer is at least $2 \times 10^6$ V/m when the interdigitated electrode pairs are selectively energized by a voltage of 100 V or less, 50 V or less, or 30 V or less.

In certain embodiments, the dielectric layer has a thickness and composition such that an electric field at a top surface of the dielectric layer is between $2 \times 10^6$ V/m and $1 \times 10^7$ V/m when the interdigitated electrode pairs are selectively energized by a voltage of 100 V or less, 50 V or less, or 30 V or less.

In certain embodiments, the dielectric layer has a thickness and composition such that an electric field at a top surface of the dielectric layer is at least $1 \times 10^7$ V/m when the plurality of interdigitated electrode pairs are selectively energized by a voltage of 100 V or less, 50 V or less, or 30 V or less.

In certain embodiments, the dielectric layer has a thickness less than 1 µm, less than 500 nm, between 400 nm and 500 nm, or about 450 nm.

In certain embodiments, the dielectric layer includes a sub layer comprising photosensitive epoxy resin. The photosensitive epoxy resin may comprise SU8 photoresist.

In certain embodiments, the dielectric layer may include a sub layer comprising a hydrophobic material. The hydrophobic material may comprise a hydrophobic self-assembled monolayer. The hydrophobic self-assembled monolayer may comprise octadecyltrichlorosilane (OTS).

In certain embodiments, the dielectric layer may include a top sub layer comprising a lubricant.

In accordance with an aspect of the present disclosure, there is provided a method of using a device as described above, comprising selectively and independently energising the at least three series of interdigitated electrode pairs to produce an electric field at a top surface of the dielectric layer so that a substance on the top surface may be manipulated by the electric field.

Energising the at least three series of interdigitated electrode pairs may comprise applying an AC voltage across each of the at least three series of interdigitated electrode pairs.

In accordance with an aspect of the present disclosure, there is provided a device for manipulating a substance, the device comprising:

at least three series of interdigitated electrode pairs, wherein each electrode of each pair is connected to an electrode in an adjacent pair in the respective series by an electrical path; and a dielectric layer disposed on the at least three series of interdigitated electrode pairs, the dielectric layer comprising one or more sub layers;

wherein the at least three series of interdigitated electrode pairs are selectively and independently energisable to produce an electric field at a top surface of the dielectric layer so that a substance on the top surface may be manipulated by the electric field;

the device further comprising one or more groups of the interdigitated electrode pairs, each group having a longitudinal axis, wherein in each group the respective interdigitated electrode pairs are arranged along the respective longitudinal axis such that along the respective longitudinal axis no two adjacent pairs are from a single one of the at least three series, and no pair is adjacent to two other pairs from a single one of the at least three series.

The at least three series of interdigitated electrode pairs may consist of only three series of interdigitated electrode pairs. Each electrode of each pair may have a length that is 15 mm or less, 10 mm or less, or 5 mm or less.

The device may comprise a plurality of groups wherein the longitudinal axes of at least some of the plurality of groups radiate out from a common point. Consecutive interdigitated electrode pairs along each longitudinal axis may increase in size in a direction away from the common point. The lengths of the consecutive interdigitated electrode pairs may increase in size in a direction away from the common point. The widths of the consecutive interdigitated electrode pairs may increase in size in a direction away from the common point.

In certain embodiments, all of the interdigitated electrode pairs and electrical paths are in the same plane as one another.

In certain embodiments, one electrode of each pair is connected to a common ground terminal.

In certain embodiments, each electrode of each of the one or more interdigitated electrode pairs comprises a root and a plurality of branches that each extend from the root along a respective longitudinal axis, wherein the plurality of branches of one electrode of the pair are interdigitated with the plurality of branches of the other electrode of the pair; wherein adjacent branches of each of the interdigitated electrode pairs are spaced from one another in a direction that is perpendicular to the respective longitudinal axis of one of the adjacent branches, and the spacing varies along a direction parallel to that respective longitudinal axis.

The spacing may decrease along the direction parallel to the respective longitudinal axis. The spacing may decrease at a substantially constant rate along the direction parallel to the respective longitudinal axis. The spacing may decrease by an amount between 150 µm and 500 µm, and optionally between 150 µm and 250 µm.

In certain embodiments, the dielectric layer has a thickness and composition such that an electric field at a top surface of the dielectric layer is at least $2 \times 10^6$ V/m when the interdigitated electrode pairs are selectively energized by a voltage of 100 V or less, 50 V or less, or 30 V or less.

In certain embodiments, the dielectric layer has a thickness and composition such that an electric field at a top surface of the dielectric layer is between $2 \times 10^6$ V/m and $1 \times 10^7$ V/m when the interdigitated electrode pairs are selectively energized by a voltage of 100 V or less, 50 V or less, or 30 V or less.

In certain embodiments, the dielectric layer has a thickness and composition such that an electric field at a top surface of the dielectric layer is at least $1 \times 10^7$ V/m when the plurality of interdigitated electrode pairs are selectively energized by a voltage of 100 V or less, 50 V or less, or 30 V or less.

In certain embodiments, the dielectric layer has a thickness less than 1 µm, less than 500 nm, between 400 nm and 500 nm, or about 450 nm.

In certain embodiments, the dielectric layer includes a sub layer comprising photosensitive epoxy resin. The photosensitive epoxy resin may comprise SU8 photoresist.

In certain embodiments, the dielectric layer may include a sub layer comprising a hydrophobic material. The hydrophobic material may comprise a hydrophobic self-assembled monolayer. The hydrophobic self-assembled monolayer may comprise octadecyltrichlorosilane (OTS).

In certain embodiments, the dielectric layer may include a top sub layer comprising a lubricant.

In accordance with an aspect of the present disclosure, there is provided a method of using a device as described above, comprising selectively and independently energising the at least three series of interdigitated electrode pairs to produce an electric field at a top surface of the dielectric layer so that a substance on the top surface may be manipulated by the electric field.

Energising the at least three series of interdigitated electrode pairs may comprise applying an AC voltage across each of the at least three series of interdigitated electrode pairs.

In certain embodiments, the AC voltage may have a frequency of 250 kHz or less, and optionally between 0.1 kHz and 2.5 kHz In accordance with an aspect of the present disclosure, there is provided a device for manipulating a substance, the device comprising:

one or more interdigitated electrode pairs, each electrode of each of the one or more interdigitated electrode pairs comprising a root and a plurality of branches that each extend from the root along a respective longitudinal axis, wherein the plurality of branches of one electrode of the pair are interdigitated with the plurality of branches of the other electrode of the pair; and a dielectric layer disposed on the one or more interdigitated electrode pairs, the dielectric layer comprising one or more sub layers;

wherein the one or more interdigitated electrode pairs are energisable to produce an electric field at a top surface of the dielectric layer so that a substance on the top surface may be manipulated by the electric field; and wherein adjacent branches of each of the one or more interdigitated electrode pairs are spaced from one another in a direction that is perpendicular to the respective longitudinal axis of one of the adjacent branches, and the spacing varies along a direction parallel to that respective longitudinal axis.

In certain embodiments, the spacing decreases along the direction parallel to the longitudinal axis. The spacing may decrease at a substantially constant rate along the direction parallel to the longitudinal axis. In certain embodiments, the spacing may decrease by an amount between 150 μm and 500 μm, and optionally between 150 μm and 250 μm.

In certain embodiments, each branch may comprise a main branch and a plurality of sub-branches extending from the main branch.

In certain embodiments, the dielectric layer may have a thickness and composition such that an electric field at a top surface of the dielectric layer is at least $2\times10^6$ V/m when the interdigitated electrode pairs are selectively energized by a voltage of 100 V or less, 50 V or less, or 30 V or less.

In certain embodiments, the dielectric layer may have a thickness and composition such that an electric field at a top surface of the dielectric layer is between $2\times10^6$ V/m and $1\times10^7$ V/m when the interdigitated electrode pairs are selectively energized by a voltage of 100 V or less, 50 V or less, or 30 V or less.

In certain embodiments, the dielectric layer may have a thickness and composition such that an electric field at a top surface of the dielectric layer is at least $1\times10^7$ V/m when the plurality of interdigitated electrode pairs are selectively energized by a voltage of 100 V or less, 50 V or less, or 30 V or less.

In certain embodiments, the dielectric layer may have a thickness less than 1 μm, less than 500 nm, between 400 nm and 500 nm, or about 450 nm.

In certain embodiments, the dielectric layer may include a sub layer comprising photosensitive epoxy resin. The photosensitive epoxy resin may comprise SU8 photoresist.

In certain embodiments, the dielectric layer may include a sub layer comprising a hydrophobic material. The hydrophobic material may comprise a hydrophobic self-assembled monolayer. The hydrophobic self-assembled monolayer may comprise octadecyltrichlorosilane (OTS).

In certain embodiments, the dielectric layer may include a top sub layer comprising a lubricant.

In certain embodiments, the device may comprise a substrate layer upon which the plurality of interdigitated electrode pairs are disposed. The substrate may be flexible.

In certain embodiments, each branch of each pair may have a length that is 15 mm or less, 10 mm or less, or 5 mm or less.

In certain embodiments, the device may comprise at least three series of interdigitated electrode pairs;

wherein each electrode of each pair is connected to an electrode in an adjacent pair in the respective series by an electrical path; and wherein the at least three series of interdigitated electrode pairs are selectively and independently energisable to produce the electric field at a top surface of the dielectric layer so that a substance on the top surface may be manipulated by the electric field;

the device may further comprise one or more groups of the interdigitated electrode pairs, each group having a longitudinal axis, wherein in each group the respective interdigitated electrode pairs are arranged along the respective longitudinal axis of the group such that along the respective longitudinal axis of the group no two adjacent pairs are from a single one of the at least three series, and no pair is adjacent to two other pairs from a single one of the at least three series.

The at least three series of interdigitated electrode pairs may consist of only three series of interdigitated electrode pairs. The device may comprise a plurality of groups wherein the longitudinal axes of at least some of the plurality of groups radiate out from a common point. Consecutive arrays of interdigitated electrode pairs along each longitudinal axis may increase in size in a direction away from the common point. The lengths of the consecutive arrays of interdigitated electrode pairs may increase in size in a direction away from the common point. The widths of the consecutive arrays of interdigitated electrode pairs may increase in size in a direction away from the common point. In certain embodiments, all of the interdigitated electrode pairs and electrical paths may be in the same plane as one another.

In certain embodiments, one electrode of each pair is connected to a common ground terminal.

In accordance with an aspect of the present disclosure, there is provided a vehicle comprising one or more devices as described above.

In accordance with an aspect of the present disclosure, there is provided an assembly comprising a substantially translucent material having one or more devices as described above embedded therein or affixed thereto, wherein optionally the substantially translucent material comprises a vehicle windscreen or an optical component.

In accordance with an aspect of the present disclosure, there is provided a method of using a device as described above, comprising energising the one or more interdigitated electrode pairs to produce an electric field at a top surface of the dielectric layer so that a substance on the top surface may be manipulated by the electric field.

Energising the at least three series of interdigitated electrode pairs may comprise applying an AC voltage across each of the one or more interdigitated electrode pairs.

In certain embodiments, the AC voltage may have a frequency of 250 kHz or less, and optionally between 0.1 kHz and 2.5 kHz

BRIEF DESCRIPTION OF THE FIGURES

Embodiments of the disclosure will now be described by way of example only, with reference to the accompanying figures, in which:

FIG. 1 shows a partially cut-away perspective view of a device in accordance with an embodiment of the present disclosure;

FIG. 2A shows a top-down view of a device in accordance with an embodiment of the present disclosure;

FIGS. 2B (i) to (iv) show chronologically progressive views of detail B of FIG. 2A with a droplet present;

FIG. 15A shows a 1 µL droplet, FIG. 15B shows a 3 µL droplet; FIG. 15C shows a 6 µL droplet; and FIG. 15D shows a 9 µL droplet;

FIG. 21 shows a schematic overview of electrodes of a device according to an embodiment of the present disclosure;

FIGS. 22A to 22D each show a schematic overview of alternative electrodes of a device according to an embodiment of the disclosure;

DETAILED DESCRIPTION

Figure 3:
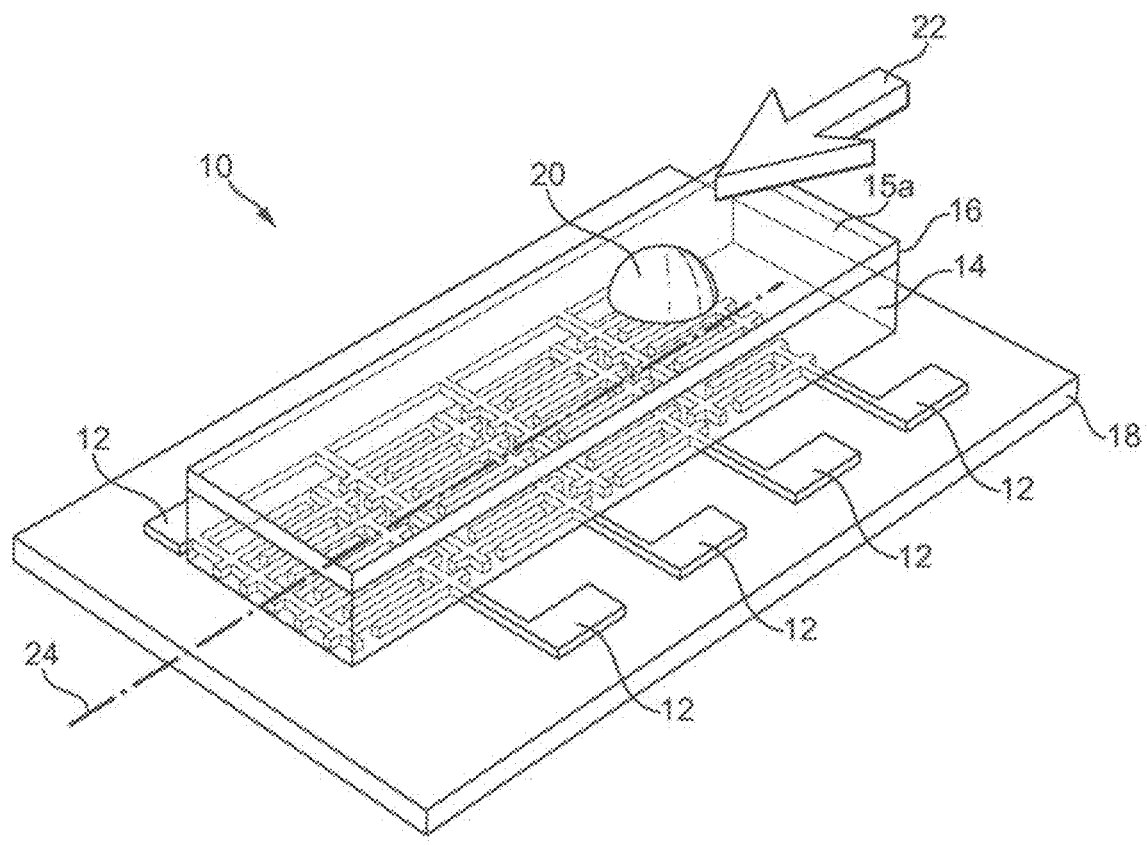
FIG. 3 shows a perspective view of a device according to an embodiment of the present disclosure with a droplet present on a top surface.

FIG. 1 shows a partially cut-away perspective view of a device 10 in accordance with an embodiment of the present disclosure. The device 10 is configured to be capable of manipulating a substance, such as a liquid droplet or a solid (e.g. ice), as is explained below.

The device 10 comprises a plurality of electrodes 12 disposed on a substrate 18. The electrodes 12 are energisable so that an electric field in the vicinity of the electrodes 12 may be created. The electrodes 12 are energisable by creating a potential difference between one of the plurality of electrodes 12 and another of the plurality of electrodes. For example, one electrode may act as a ground electrode relative to one or more of the other electrodes. The applied voltage may be constant or variable in time.

The plurality of electrodes 12 is overlaid by a dielectric layer 15. In the non-limiting embodiment shown in the Figures, the dielectric layer 15 comprises two sub layers, namely, a primary dielectric layer 14 and a hydrophobic layer 16 that is disposed on top of the primary dielectric layer 14. In certain embodiments, the dielectric layer 15 may include a superhydrophobic layer.

In certain embodiments, one of the sub layers of the dielectric layer 15 (e.g. the primary dielectric layer 14) may comprise a photosensitive epoxy resin, for example SU8 photoresist. A thinner dielectric layer 15 may be employed by using alternative insulating materials such as silicon dioxide or aluminium oxide.

In certain embodiments, the hydrophobic layer 16 may comprise a hydrophobic self-assembled monolayer (e.g. octadecyltrichlorosilane (OTS)).

A top surface 15*a* of the dielectric layer 15 (which, in the embodiment shown in FIG. 1, is a top layer of hydrophobic layer 16 and a top surface of the device 10 as a whole) defines a surface that may support a substance such as a liquid droplet or a solid such as ice, wherein the substance may be manipulated by an electric field generated by energised ones of the plurality of electrodes 12. For example, in accordance with methods according to embodiments of the present disclosure, a liquid droplet may be caused to move across the top surface 15*a* by selectively energising the plurality of electrodes 12. Additionally or alternatively, the energised electrodes 12 may produce heat so that a frozen solid disposed on the top surface 15*a* may be partially or fully melted (or sublimated). In alternative embodiments, the dielectric layer 15 may comprise one or more sub layers, and not necessarily the primary dielectric layer 14 and hydrophobic layer 16 described above.

In certain embodiments, the spacing between the plurality of electrodes 12 is 100 μm or less. In other embodiments, the spacing between the plurality of electrodes 12 is 20 μm or less, or even as small as 5 μm or less.

In certain embodiments, the dielectric layer 15 has a thickness and composition such that an electric field at the top surface 15*a* of the dielectric layer 15 is at least $2 \times 10^6$ V/m when the plurality of electrodes are selectively energised by a voltage of 100 V or less.

The electric field at the top surface 15*a* causes a change in contact angle (at the solid-liquid interface) of a droplet disposed on the top surface. If the change in contact angle is sufficient, the droplet may be caused to move on the top surface.

Devices in accordance with certain embodiments of the present disclosure may be operable at lower voltages relative to prior art arrangements, thus facilitating their suitability to a wide variety of applications. Lower operating voltages are made possible by a reduction in the spacing between electrodes relative to prior art arrangements. However, this leads to a lower penetration depth of the electric field created by energised electrodes, so the dielectric layer (i.e. its thickness and composition) needs to be selected so that the electric field at the top surface 15*a* is at least $2 \times 10^6$ V/m. At such a magnitude, a droplet may have a contact angle at the solid-liquid interface such that it may be moved or otherwise manipulated by selective activation of the electrodes 12. In this context, the thickness of the dielectric layer 15 may be considered to be the dimension along a direction substantially perpendicular to the general plane that includes the plurality of electrodes 12. In certain embodiments, the electric field at the top surface is at least $12 \times 10^7$ V/m despite using a voltage of 100 V or less. The electric field required to manipulate the droplet may be reduced by the presence of a lubricant (e.g. an oil-based lubricant) on the top surface 15*a*. In this sense a top sub layer of the dielectric layer 15 may be considered to be a lubricant layer.

In certain embodiments, the dielectric layer may have a thickness less than 1 μm, less than 500 nm, between 400 nm and 500 nm, or about 450 nm.

FIG. 2A shows a top-down view of a device 10 in accordance with an embodiment of the present disclosure. The device of FIG. 2A comprises a plurality of electrodes 12 and may otherwise be in accordance with the device 10 described above in relation to FIG. 1.

FIGS. 2B (i) to (iv) show chronologically progressive photographic views of detail B of FIG. 2A with a droplet 20 present on the top surface. In FIG. 2B electrodes in the shaded region 13 are energised while electrodes outside of shaded region 13 are not energised. As can be seen from the progression from (i) to (iv), as the shaded region 13 representing energised electrodes is moved across the device 10, the droplet 20 is also caused to move across the top surface 15*a*. In the example shown in FIG. 2B, the droplet comprises deionised water and the electrodes were energised using 100 V at 50 kHz with 100 ms delay per step.

FIG. 3 shows a perspective view of a device 10 according to an embodiment of the present disclosure. The device 10 extends along a longitudinal axis 24 that is intersected by each of the plurality of electrodes 12. In the non-limiting embodiment shown in FIG. 3, one of the plurality of electrodes 12 serves as a common ground electrode, and others of the plurality of electrodes 12 are arranged to form pairs of electrodes between themselves and the common ground electrode. That is, a series of electrode pairs is provided, but the pairs share a common electrode so there are no unique pairs. The pairs of electrodes 12 are selectively energisable to create an electric field that is experienced by a droplet 20 on the top surface 15*a* and consequently manipulated. By sequentially energising the pairs of electrodes 12, the droplet 20 may be caused to move along the top surface 15*a* in the direction indicated by numeral 22 in FIG. 3 (which is parallel to the longitudinal axis 24).

Figure 4:
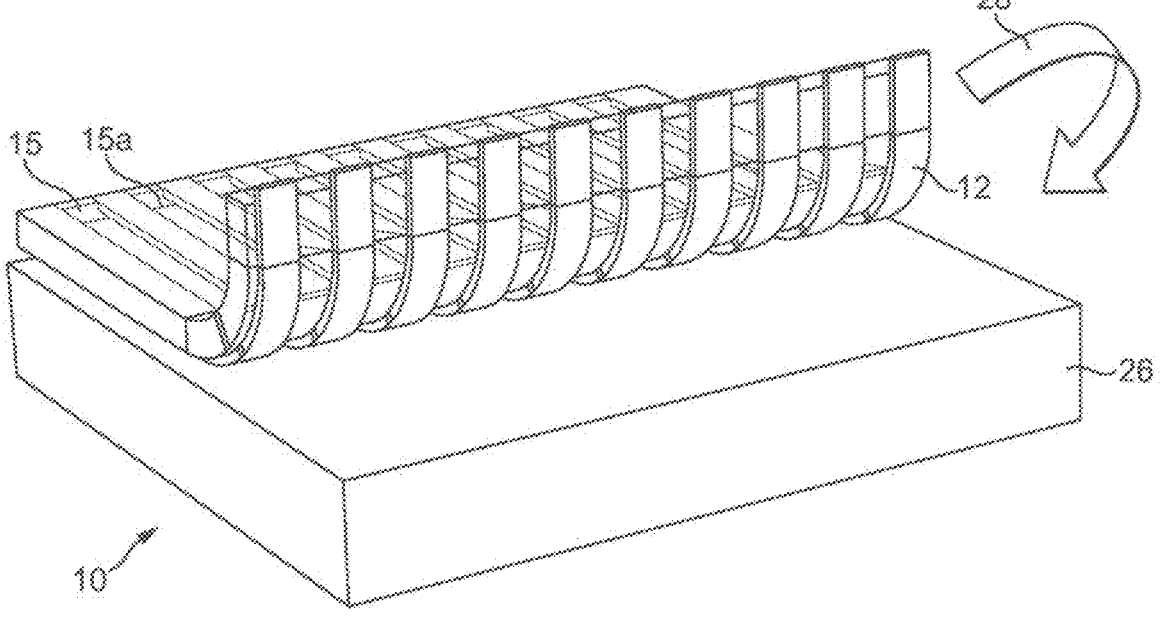
FIG. 4 shows a perspective view of a device according to an embodiment of the present disclosure during fabrication.

A device 10 according to an alternative embodiment is shown in FIG. 4. The device 10 of FIG. 4 is not fabricated on a substrate per se (that is distinct from the dielectric layer). Rather, the dielectric layer 15 acts as a substrate for supporting the electrodes 12. Moreover, the dielectric layer 15 comprises a flexible material so that the device 10, as a whole, is flexible. The flexible device 10 may be affixed (indicated by arrow 28 in FIG. 4) to a surface 26 that may be curved and/or be flexible itself. In some embodiments, the device 10 may be provided with an adhesive protecting layer for affixing the device 10 to a surface.

Figure 5:
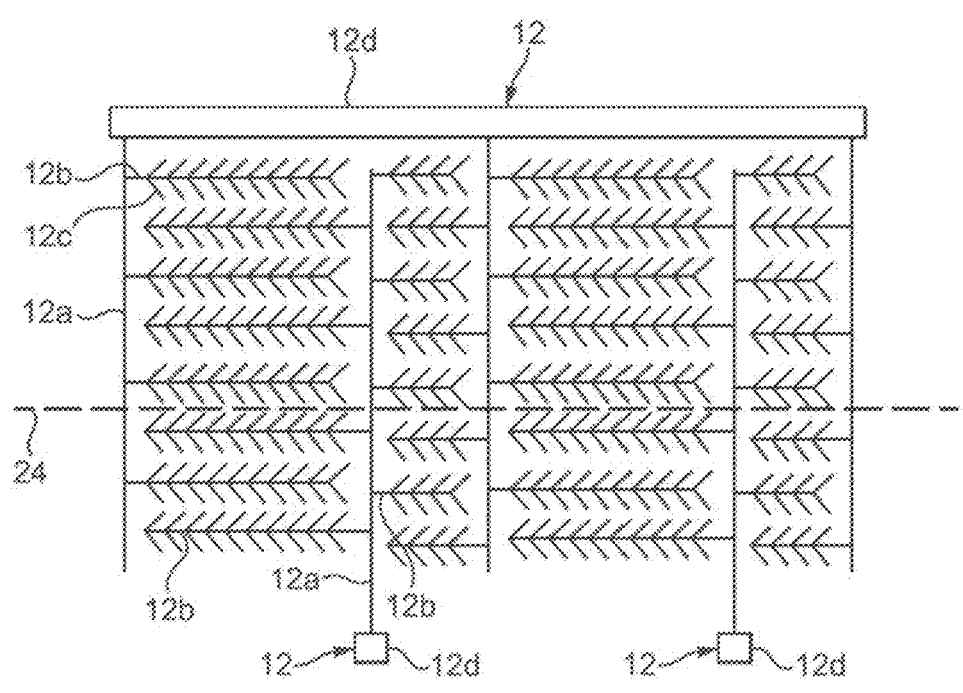
FIG. 5 shows a schematic overview of electrodes of a device according to an embodiment of the present disclosure.

FIG. 5 shows a schematic overview of a plurality of electrodes 12 of a device 10 according to an embodiment of the present disclosure. Each electrode 12 comprises a root 12*a*, a plurality of branches 12*b* that each extend from the root 12*a*, and a plurality of sub-branches 12*c* that each extend from each of the plurality of branches 12*b*. Each electrode 12 additionally includes an electrode pad 12*d* that is greater in area relative to adjacent areas of the respective electrode 12. The electrode pad 12*d* may be used to electrically connect the electrode to a source of electrical energy so as to apply a potential difference. In the non-limiting embodiment shown in FIG. 5, some electrodes 12 (every alternate one) share a common electrode pad 12*d*. In alternative embodiments, each electrode 12 may comprise an individual electrode pad 12*d*. Also in the non-limiting embodiment shown in FIG. 5, certain ones of the electrodes 12 include branches 12*b* that extend from opposite sides of the respective root 12*a*. In the embodiment shown, the branches 12*b* extending from one side of the respective root 12*a* are of a different length to the branches 12*b* extending from the other side of the root 12*a*. In alternative embodiments, branches 12*b* extending from both sides of a root 12*a* may be of substantially equal length.

The electrodes 12 are arranged in pairs so that the plurality of branches 12*b* of a first electrode 12 are interdigitated with the plurality of branches 12*b* of a second, adjacent electrode 12 of the pair. Thus, the two adjacent electrodes 12 may be described as an interdigitated electrode pair. As noted above, in some embodiments, a single electrode 12 may serve as a common electrode to two or more of the other electrodes 12 so that not all pairs comprise unique electrodes 12.

In the specific embodiment shown in FIG. 5, the interdigitated electrode pairs are unique as no one electrode features in more than one pair.

The non-limiting embodiment of FIG. 5 additionally shows an arrangement in which the root 12a of the first electrode 12 of each interdigitated electrode pair is substantially parallel to the root 12a of the second electrode 12 of the interdigitated electrode pair. Furthermore, each of the plurality of branches 12b extends substantially perpendicularly from the respective root 12a. Each of the plurality of sub-branches 12c extends from the respective plurality of branches 12b at an inclined angle (i.e. an angle that is not 90°). In the embodiment of FIG. 5, the sub-branches 12c all extend from their respective branch 12b in the same direction relative to the longitudinal axis 24 irrespective of which of the electrodes of the pair they belong.

Figure 6A:
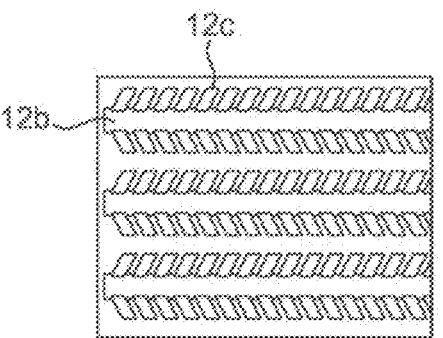
FIGS. 6A to 6D each show a schematic overview of alternative electrodes of a device according to an embodiment of the disclosure.
Figure 6B:
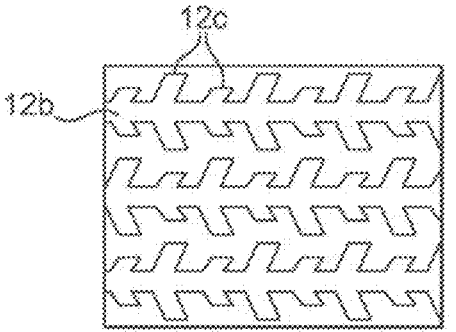

FIGS. 6A to 6D each show a partial view of alternative electrodes of a device according to an embodiment of the disclosure. FIG. 6A shows an arrangement that is similar to the embodiment of FIG. 5, but wherein the spacing between adjacent sub-branches 12c is smaller relative to the respective spacings shown in FIG. 5.

In certain embodiments, the plurality of sub-branches 12c of each of the first and second electrodes 12 of each interdigitated electrode pair comprise a first set of sub-branches and a second set of sub-branches, where the first set of sub-branches is not identical to the second set of sub-branches. For example, in the embodiment shown in FIG. 6B, a first set of sub-branches 12c comprise longer sub-branches 12c than a second set of sub-branches and individual ones of the first set are alternately arranged with individual ones of the second set. For the avoidance of doubt, a "longer" sub-branch 12c extends further from the respective branch 12b relative to a "shorter sub-branch 12c.

Figure 6C:
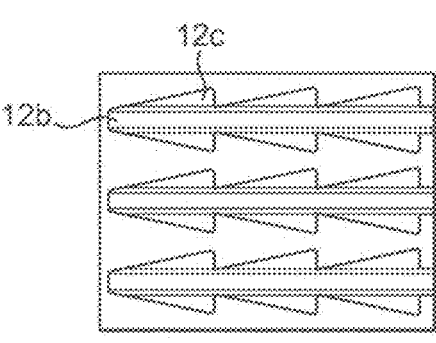

FIG. 6C shows an embodiment in which the sub-branches 12c are substantially wedge-shaped (i.e. generally triangular) and extend from the respective branches 12b to form a saw-tooth profile.

Figure 6D:
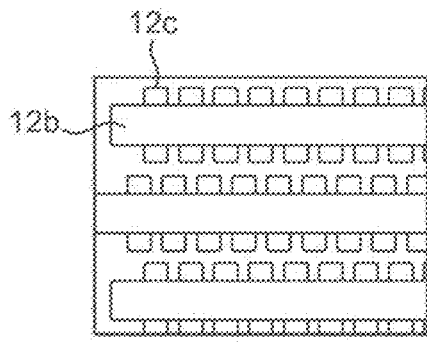

In the embodiment of FIG. 6D, the plurality of sub-branches 12c extend substantially perpendicularly from the respective plurality of branches 12b. Moreover, each of the plurality of sub-branches 12c of the first electrode of each interdigitated electrode pair has a longitudinal axis that is not coincident with a longitudinal axis of each of the plurality of sub-branches 12c of the second electrode of the interdigitated electrode pair. To state this another way, the plurality of sub-branches 12c of the first electrode of each interdigitated electrode pair are not aligned with the plurality of sub-branches 12c of the second electrode of the interdigitated electrode pair along an axis that is perpendicular to the axes along which the branches 12b extend.

The geometrical "irregularities" provided by the arrangements shown in FIGS. 5 and 6A to 6D serve to enhance the local electric fields generated by the electrodes 12.

Figure 7:
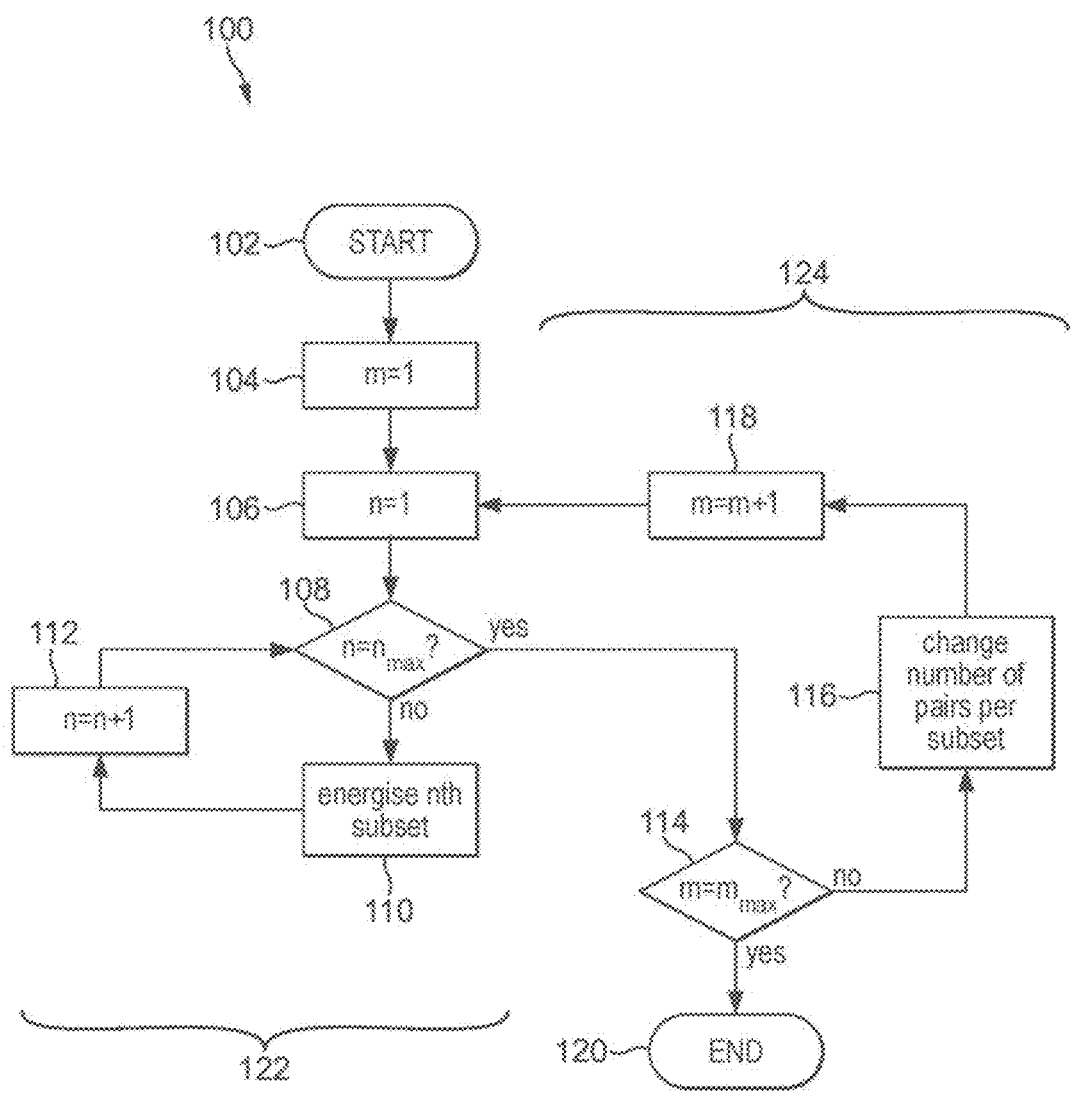
FIG. 7 shows a schematic representation of a method of controlling electrodes in accordance with an embodiment of the present disclosure.

FIG. 7 shows a schematic representation of a method 100 of controlling a plurality of electrodes 12 in accordance with an embodiment of the present disclosure.

The method 100 starts at block 102 and a cycle number m is set to 1 at block 104 (since a first cycle of controlling the electrodes 12 must take place prior to any subsequent cycle) and a counter n is set to 1 at block 106. The counter n is used to define a step number.

The method 100 includes an outer iterative loop 124 in which m is increased by 1 each time until a maximum value of m, mmax, is reached. The method 100 additionally includes an inner iterative loop 122 which is nested in the outer iterative loop 124 and in which n is increased by 1 each time until a maximum value of n, nmax, is reached. Considering the inner iterative loop 122, at block 108 a check is made to verify that n has not yet reached nmax. If it has not, an nth subset of the plurality of electrode pairs 12 is energised in a nth step at block 110. Next, n is increased by 1 at block 112 and the verification at block 108 is repeated. If n=n+1 remains below nmax, then the inner iterative loop 124 continues and a nth subset (for n=n+1) of the plurality of electrode pairs 12 is energised at block 110 in a n=n+1th step. In the n=n+1th step, electrode pairs of the n=n+1th subset are adjacent to electrode pairs of the nth (i.e. previously energies) subset. Additionally, in the n=n+1th step the n=n+1th subset comprises the same number of electrode pairs as the nth subset. That is, for a given cycle (i.e. a given value of m) the number of electrode pairs energised in each subset does not change.

The value of n is increased at block 112 once more and the inner iterative loop 122 is repeated until the updated value of n equals nmax.

If block 108 determines that n=nmax then a check is made at block 114 as to whether the cycle number m has reached mmax. If it has not, then a notional change is made to the number of pairs of electrodes that are to be energised in the forthcoming cycle (relative to the number of energised electrode pairs in each subset in the previous cycle). The change made at block 116 could be an increase or a decrease which may be according to a fixed increment or a changeable increment. In certain embodiments, the change made at block 116 is an increase where the increment of the change is according to a sequence or a part of a sequence. For example, the change made at block 116 may be an increase according to a part of the Fibonacci sequence, e.g. 1, 2, 3, 5. Once the change has been made at block 116, the cycle number m is increased at block 118 and the inner iterative loop 122 cycles from n=1 to n=nmax, where the number of electrode pairs energised at block 110 is according to the number set previously at block 116.

The inner iterative loop 122 and the outer iterative loop 124 continue until n=nmax as determined at block 108 and m=mmax as determined at block 114. When these two conditions are met, the method 100 ends at block 120.

In alterative embodiments, other suitable predetermined conditions (i.e. other than n=nmax and/or m=mmax) may be used to terminate the outer iterative loop 124 and/or the inner iterative loop 122.

In certain embodiments, the inner iterative loop 122 may be performed and repeated with the same number of energised electrode pairs before the outer iterative loop 124 causes the number of energised electrode pairs to be changed.

In certain embodiments the method 100 may be performed simultaneously over several regions of an array of electrodes. That is, the area over which the method is performed may be easily varied so that the present disclosure may be suitably scaled to a wide variety of applications.

Figure 8:
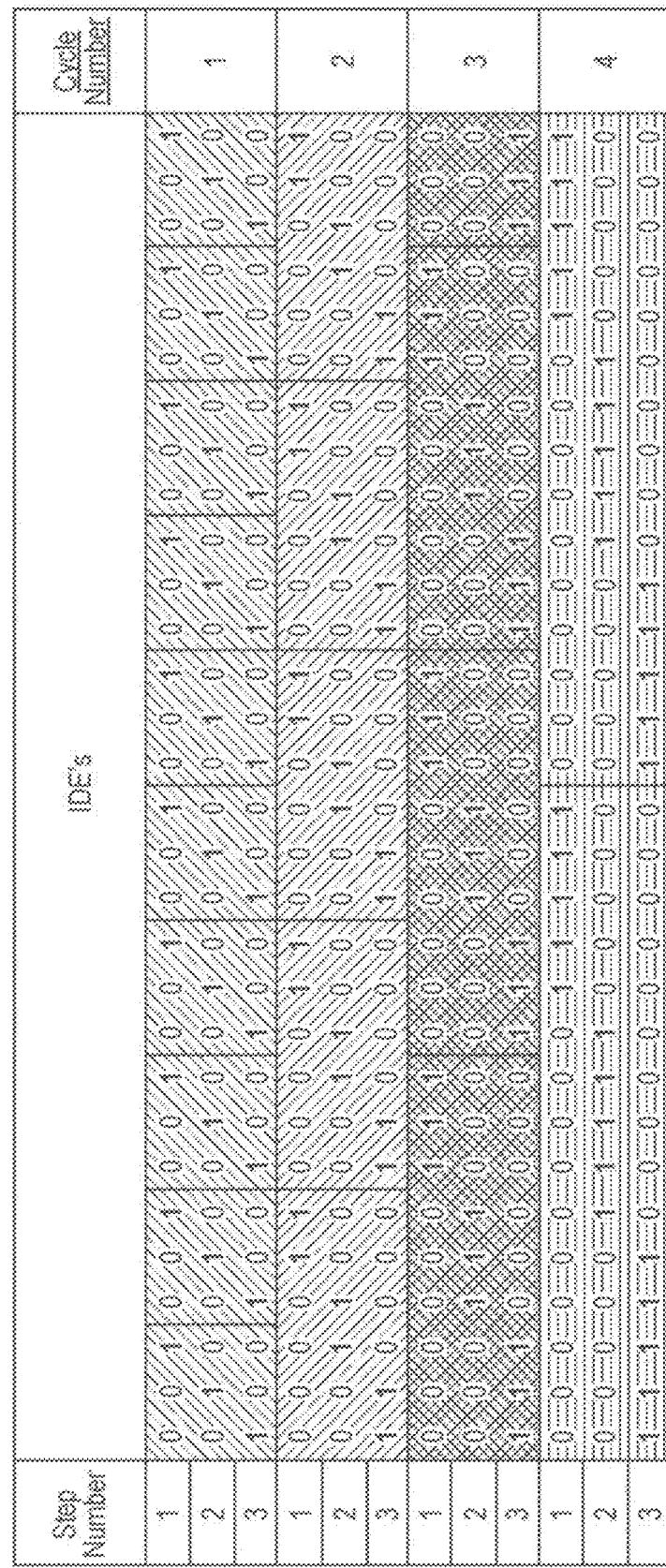
FIG. 8 shows a schematic representation of how a specific method of controlling electrodes may be performed in accordance with an embodiment of the present disclosure.

FIG. 8 shows a schematic representation of how a specific method 100' of controlling electrodes 12 (labelled IDEs for interdigitated electrodes) may be performed in accordance with an embodiment of the present disclosure. FIG. 8 schematically represents electrode pairs 12 by a 0 or a 1, where a 0 denotes a non-energised electrode pair 12 and a 1 denotes an energised electrode pair 12. In FIG. 8, the step numbers 1 to 3 correspond to n=1, 2, 3 (where nmax=3) with respect to the inner iterative loop 122 described above.

Similarly, the cycle numbers 1 to 4 correspond to m=1, 2, 3, 4 (wherein mmax=4) with respect to the outer iterative loop 124 described above.

In a 1st cycle (i.e. m=1), 1st to 3rd steps (i.e. n=1, 2, 3) are performed. In a 1st step (n=1), a single electrode pair is energised. That is, the subsets of the 1st cycle comprise a single electrode pair. In a second step (n=2), a single electrode pair that is adjacent to the previously energised electrode pair is energised (i.e. relative to the 1st step). In a third step (n=3) a single electrode pair that is adjacent to the previously energised electrode pair is energised (i.e. relative to the 2nd step).

In the example of FIG. 8, the method is performed multiple times simultaneously across the array of electrode pairs (10 times in the 1st cycle in the specific example shown in FIG. 8). In this example, the simultaneously energised electrode pairs are spaced from one another so that the final subset (i.e. in the nmaxth step) of energised electrode pairs in the cycle is adjacent to the first subset (i.e. in the 1st step) of energised electrode pairs in that same cycle.

In the 2nd cycle (i.e. m=2), 1st to 3rd steps (i.e. n=1, 2, 3) are performed once more, but with a different number of electrode pairs in each energised subset (relative to the previous cycle, m=1). In certain embodiments, two electrode pairs are energised in each step (n=1, 2, 3) of the 2nd cycle.

In the 3rd cycle (i.e. m=3), 1st to 3rd steps (i.e. n=1, 2, 3) are performed once more, but with a different number of electrode pairs in each energised subset (relative to the previous cycle, m=2). In certain embodiments, three electrode pairs are energised in each step (n=1, 2, 3) of the 3rd cycle.

In the 4th cycle (i.e. m=3), 1st to 3rd steps (i.e. n=1, 2, 3) are performed once more, but with a different number of electrode pairs in each energised subset (relative to the previous cycle, m=3). In certain embodiments, five electrode pairs are energised in each step (n=1, 2, 3) of the 4th cycle.

The number of electrode pairs energised in the 1st, 2nd, 3rd and 4th cycles are 1, 2, 3, 5 respectively which is in accordance with a part of the Fibonacci sequence.

FIGS. 9A to 9E demonstrate an example of the effectiveness of a method of the type described above in relation to FIGS. 7 and 8. A schematic representation of the method performed to produce the effects shown in FIGS. 9A to 9H is shown in FIG. 9I.

Figure 9:
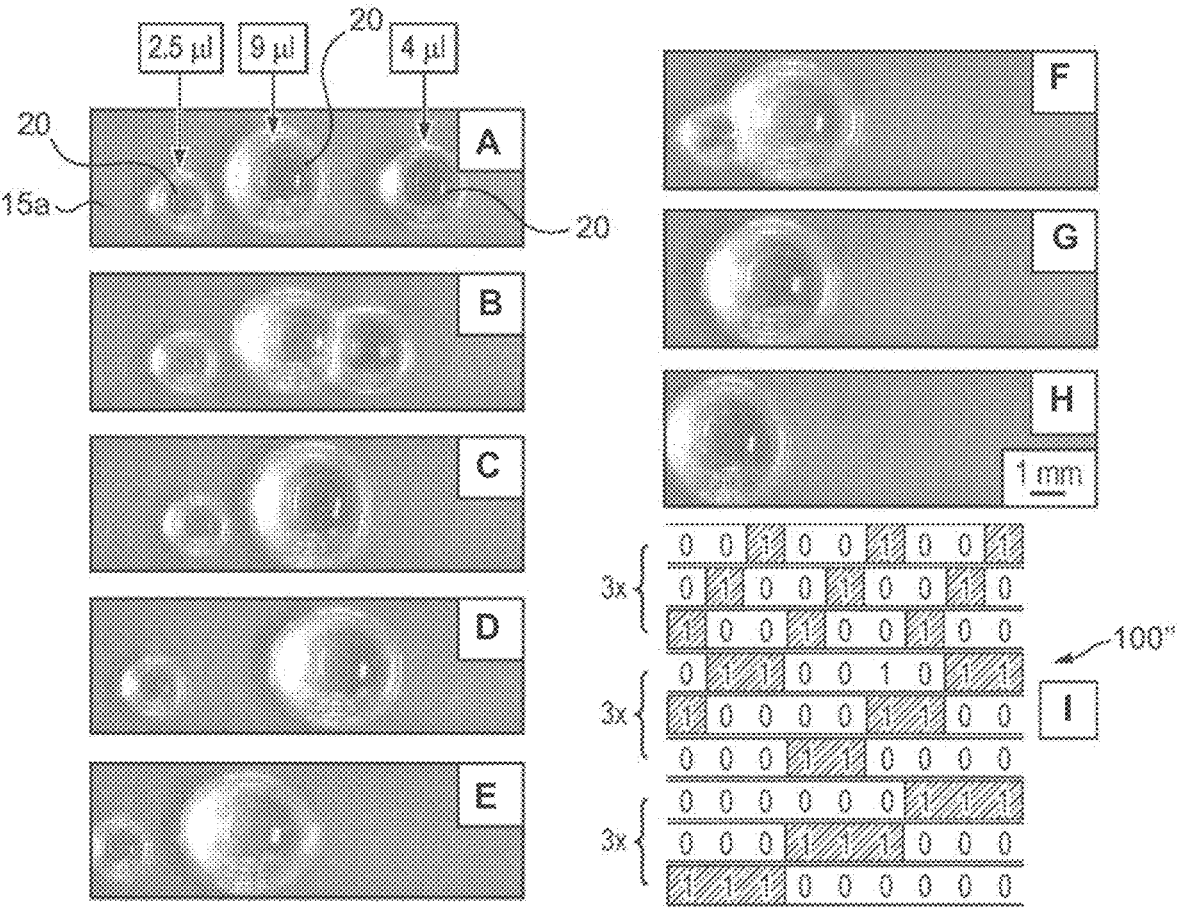
FIGS. 9A to 9H show chronologically progressive views of droplets on a device in accordance with an embodiment of the present disclosure.
FIG. 9I shows a schematic representation of the method performed to produce the effects shown in FIGS. 9A to 9H.

FIGS. 9A to 9H show chronologically progressive views of droplets 20 on a top surface 15a of a device in accordance with an embodiment of the present disclosure. In FIG. 9A, three droplets 20 are present and are of different volumes, namely 2.5 µl, 4 µl, and 9 µl. The droplets comprise droplets of deoinised deionised water.

The top surface 15a is a top surface of a lubricant layer (i.e. the dielectric layer includes a lubricant layer as its uppermost layer). The electrode pairs (not visible in FIGS. 9A to 9H) are selectively energised in accordance with a method 100" that is schematically represented in FIG. 9I in order to produce the effects shown in FIGS. 9A to 9H. The electrode pairs are energised at a voltage of 85 V with a frequency of 50 kHz, with a 100 ms delay per step (an additional delay time was also employed to enable a precise monitoring of the droplets in this example). The method 100" causes the movement of the droplets across the top surface 15a. The cycles were each repeated three times and this ensured a complete transition of the droplets to the left side of the top surface 15a. In the specific method 100", the code repeats itself every three electrode pairs. The method 100" may be applied to any number of electrode pairs, but a minimum of nine electrode pairs are needed for the three iteration cycles depicted in FIG. 9I.

Considering the effect of the method 100" on the droplets 10, the smaller droplets 20 are initially caused to move (by the activation of single electrode pairs) and the 4 µl droplet merges with the 9 µl droplet. However, after 1.5 seconds, the newly formed larger droplet covers an area of the top surface 15a that overlays more than three electrode pairs and, as a consequence, the actuation towards the left side of the device is delayed until the full set of iterations is repeated multiple times. The actuation process of a droplet moving from one electrode pair to another is only possible when the droplet moves to an area over an electrode pair which is due to be active (i.e. energised), otherwise it will move back to the previous electrode for the next set of iterations. Furthermore, depending on the application, the back-and-forth motion of the droplets on the top surface 15a may be desirable as it can be used to remove impurities from the top surface 15a. Alternatively, a direct linear actuation, which avoids the back-and-forth motion, can be realised using a longer activation of the electrode pairs, or a device with a higher electrode resolution.

The results shown in FIGS. 9A to 9H verify that the actuation of droplets with varying volume is possible using low operating voltages, without the need of any active feedback control system. Furthermore, the generated electric fields can penetrate mild ionic solutions (such as salty water) when they are applied with a sufficient high frequency.

Figure 10:
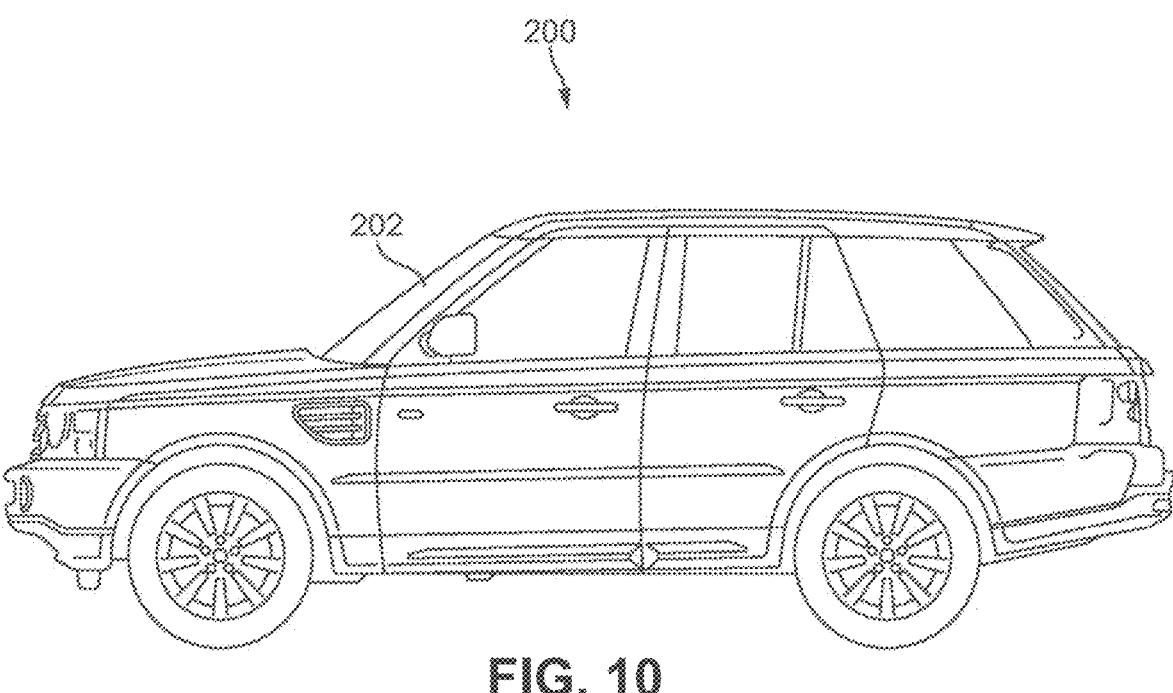
FIG. 10 shows a vehicle according to an embodiment of the present disclosure.

FIG. 10 shows a vehicle 200 according to an embodiment of the present disclosure. The vehicle 200 may incorporate any of the devices described above and/or any component that is controlled according to the methods described above. For example, a windscreen 202 of the vehicle 200 may include any of the devices described above such that liquid droplets may be caused to move to a specified region of the windscreen (e.g. an edge). In alternative embodiments, other components such as substantially translucent materials of the vehicle may incorporate the above-described devices and/or be controlled according to the above-described methods.

In alternative embodiments, the methods and/or apparatus described above may be used to manipulate substance in a manner other than that depicted in FIGS. 9A to 9H (i.e. other than transporting liquid droplets along the top surface). For example the substance that is to be manipulated may be a solid (e.g. ice). Devices and/or methods according to embodiments of the present disclosure may be used to cause melting or sublimation of the solid substance. Such an operation may be achieved by selecting the frequency at which the voltage is applied to the electrode pairs to be one that causes heating of the substance. Alternatively, devices and/or methods according to embodiments of the present disclosure may be used to spread a liquid substance (that may initially, for example, be in droplet form) over the top surface.

Figures 11, 12:
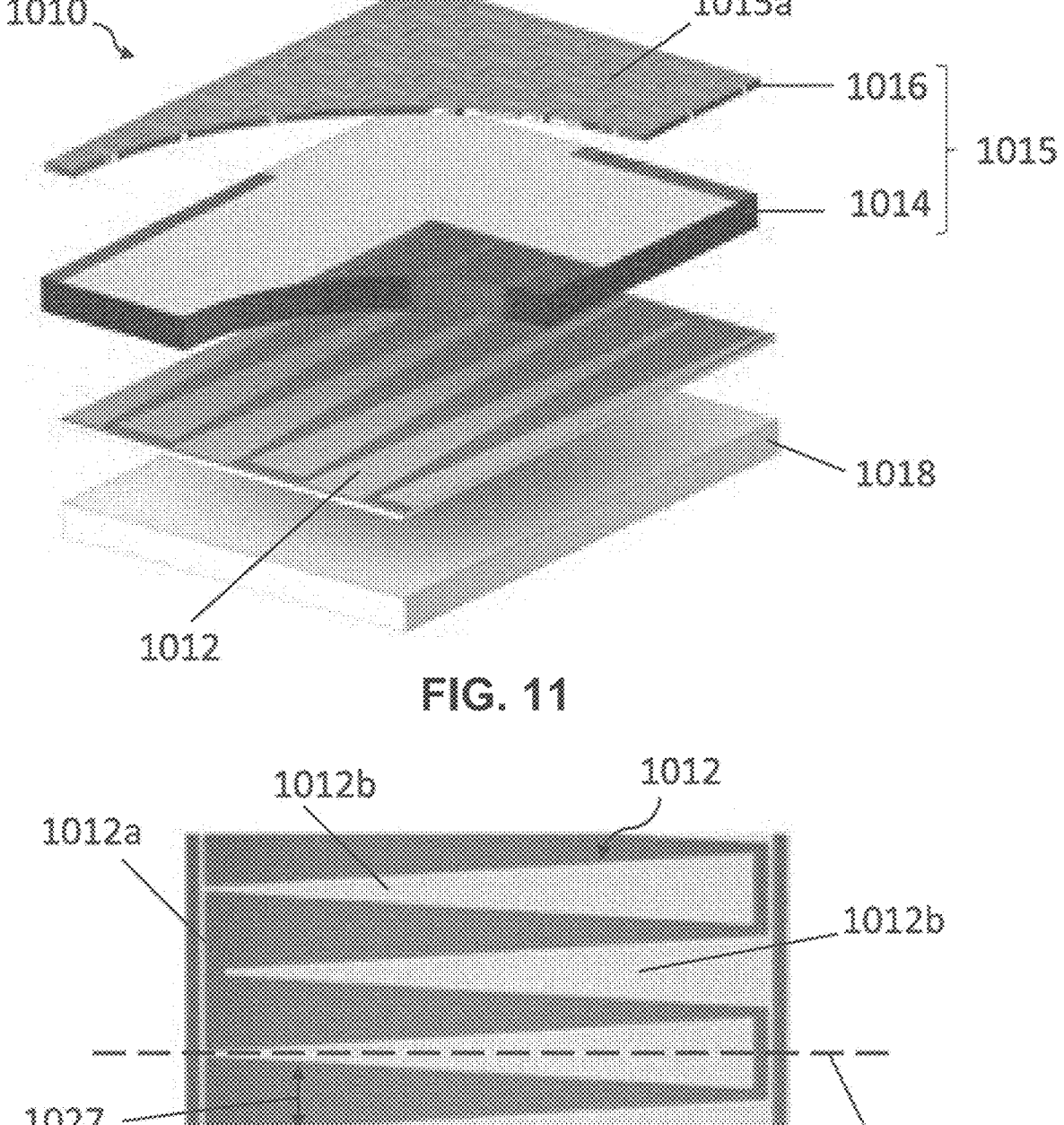
FIG. 11 shows a partially cut-away perspective view of a device in accordance with an embodiment of the present disclosure.
FIG. 12 shows a top-down view of a device in accordance with an embodiment of the present disclosure.

FIG. 11 shows a partially cut-away perspective view of a device 1010 in accordance with an embodiment of the present disclosure. The device 1010 is configured to be capable of manipulating a substance, such as a liquid droplet or a solid (e.g. ice), as is explained below.

The device 1010 comprises a plurality of electrodes 1012 disposed on a substrate 1018, which in certain embodiments may be flexible. The electrodes 1012 are energisable so that an electric field in the vicinity of the electrodes 1012 may be created. The electrodes 1012 are energisable by creating a potential difference between one of the plurality of electrodes 1012 and another of the plurality of electrodes. For example, one electrode 1012 may act as a ground electrode relative to one or more of the other electrodes 1012. The applied voltage may be constant or variable in time.

The plurality of electrodes 1012 is overlaid by a dielectric layer 1015. In the non-limiting embodiment shown in the Figures, the dielectric layer 1015 comprises two sub layers, namely, a primary dielectric layer 1014 and a hydrophobic layer 1016 that is disposed on top of the primary dielectric layer 1014. In certain embodiments, the dielectric layer 1015 may include a superhydrophobic layer.

In certain embodiments, one of the sub layers of the dielectric layer 1015 (e.g. the primary dielectric layer 1014) may comprise a photosensitive epoxy resin, for example SU8 photoresist. A thinner dielectric layer 1015 may be employed by using alternative insulating materials such as silicon dioxide or aluminium oxide.

In certain embodiments, the hydrophobic layer 1016 may comprise a hydrophobic self-assembled monolayer (e.g. octadecyltrichlorosilane (OTS), Teflon®, or another polymer coating).

A top surface 1015a of the dielectric layer 1015 (which, in the embodiment shown in FIG. 11, is a top layer of hydrophobic layer 1016 and a top surface of the device 1010 as a whole) defines a surface that may support a substance such as a liquid droplet or a solid such as ice, wherein the substance may be manipulated by an electric field generated by energised ones of the plurality of electrodes 1012. For example, in accordance with methods according to embodiments of the present disclosure, a liquid droplet may be caused to move across the top surface 1015a by selectively energising the plurality of electrodes 1012. Additionally or alternatively, the energised electrodes 1012 may produce heat so that a frozen solid disposed on the top surface 1015a may be partially or fully melted (or sublimated). In alternative embodiments, the dielectric layer 1015 may comprise one or more sub layers, and not necessarily the primary dielectric layer 1014 and hydrophobic layer 1016 described above.

In certain embodiments, the dielectric layer 1015 has a thickness and composition such that an electric field at the top surface 1015a of the dielectric layer 1015 is at least $2\times10^6$ V/m when the plurality of electrodes are selectively energised by a voltage of 100 V or less.

The electric field at the top surface 1015a causes a change in contact angle (at the solid-liquid interface) of a droplet disposed on the top surface. If the change in contact angle is sufficient, the droplet may be caused to move on the top surface.

Devices in accordance with certain embodiments of the present disclosure may be operable at lower voltages relative to prior art arrangements, thus facilitating their suitability to a wide variety of applications. Lower operating voltages are made possible by a reduction in the spacing between electrodes relative to prior art arrangements. However, this leads to a lower penetration depth of the electric field created by energised electrodes, so the dielectric layer (i.e. its thickness and composition) needs to be selected so that the electric field at the top surface 1015a is at least $2\times10^6$ V/m. At such a magnitude, a droplet may have a contact angle at the solid-liquid interface such that it may be moved or otherwise manipulated by selective activation of the electrodes 1012. In this context, the thickness of the dielectric layer 1015 may be considered to be the dimension along a direction substantially perpendicular to the general plane that includes the plurality of electrodes 1012. In certain embodiments, the electric field at the top surface 1015a is between $2\times10^6$ V/m and $1\times10^7$ V/m when using a voltage of 100 V or less. In some embodiments, the electric field at the top surface is at least $1\times10^7$ V/m despite using a voltage of 100 V or less. The electric field required to manipulate the droplet may be reduced by the presence of a lubricant (e.g. an oil-based lubricant) or a superhydrophobic coating on the top surface 1015a. In this sense a top sub layer of the dielectric layer 1015 may be considered to be a lubricant layer.

In certain embodiments, the dielectric layer may have a thickness less than 1 μm, less than 500 nm, between 400 nm and 500 nm, or about 450 nm.

FIG. 12 shows a top-down view of a device 1010 in accordance with an embodiment of the present disclosure. The device of FIG. 12 comprises a plurality of electrodes 1012 and may otherwise be in accordance with the device 1010 described above in relation to FIG. 11.

Each electrode 1012 comprises multiples branches 1012b that each extend along a respective longitudinal axis 1025. The branches 1012b extend from a common root 1012a of each electrode 1012. In certain embodiments, each branch 1012b has a length that is 15 mm or less, 10 mm or less, or 5 mm or less. The electrodes are arranged in pairs where the branches 1012b of one electrode 1012 of the pair are interdigitated with the branches 1012b of the other electrode of the pair, thus forming an interdigitated electrode pair. Along a direction that is perpendicular to the longitudinal axes 1025, the branches 1012b of each electrode 1012 alternate. In the non-limiting embodiment shown in FIG. 12, the two electrodes 1012 of the pair are arranged so that the longitudinal axes 1025 of adjacent branches 1012b are parallel to one another. The two electrodes 1012 of the interdigitated electrode pair are spaced from one another so that a gap exists. As a result, when a voltage is applied across the pair of electrodes 1012, an electric field is created between the electrodes 1012. This electric field extends to the top surface 1015a so that a substance disposed thereon may be manipulated by the electric field.

In the embodiment of FIG. 12, adjacent branches 1012b of the interdigitated electrode pair are spaced from one another in a direction that is perpendicular to the longitudinal axis 1025 of one of the adjacent branches 1012b. This spacing is indicated in FIG. 12 by reference numeral 1027, and it varies along a direction parallel to the respective longitudinal axis 1025. In some embodiments, the spacing decreases at a constant rate along a direction parallel to the longitudinal axis 1025. In certain embodiments, the spacing decreases by an amount between 150 μm and 500 μm, and optionally between 150 μm and 250 μm. For example, the spacing may vary from a maximum of between 200 μm and 500 μm to a minimum of between 20 μm and 50 μm. In alternative embodiments the spacing may decrease at a non-constant rate along a direction parallel to the longitudinal axis 1025. In certain embodiments, the spacing may increase and decrease in a regular or irregular manner along a direction parallel to the longitudinal axis 1025.

In the non-limiting embodiment of FIG. 12, the spacing varies due to the branches 1012b being triangular in shape. In general, the branches 1012b may have any suitable geometry to provide the varying spacing, and not all branches 1012b may necessarily be identical to one another.

Figure 13:
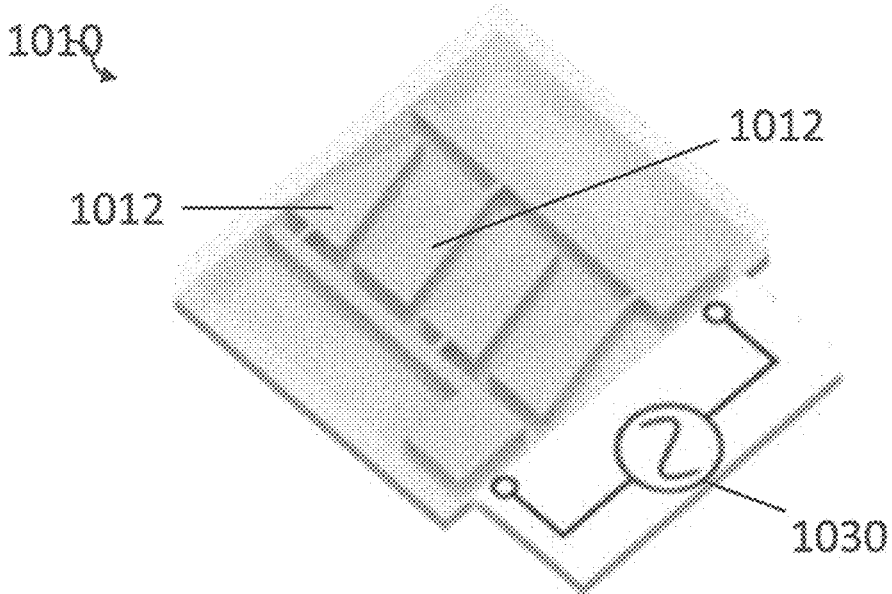
FIG. 13 shows a perspective view of a device according to an embodiment of the present disclosure connected to a voltage source.

FIG. 13 shows a device according to an embodiment of the present disclosure with a voltage source 1030 connected to the two electrodes 1012 of an interdigitated electrode pair, such as the one described above with reference to FIG. 12. The application of a voltage by the voltage source 1030 creates an electric field between the electrodes 1012 and this electric field may extend to the top surface 1015a of the device to manipulate a substance thereon.

Figure 14:
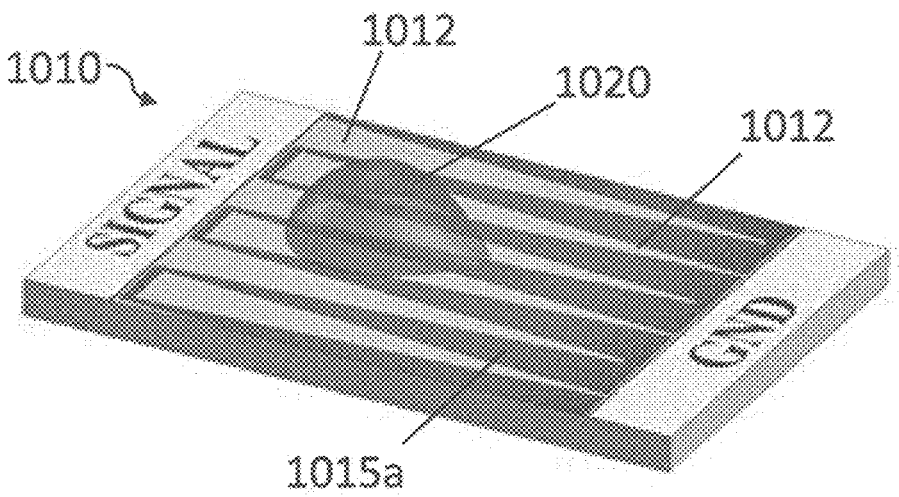
FIG. 14 shows a perspective view of a device according to an embodiment of the present disclosure with a droplet present on a top surface.
Figures 15A, 15B, 15C, 15D:
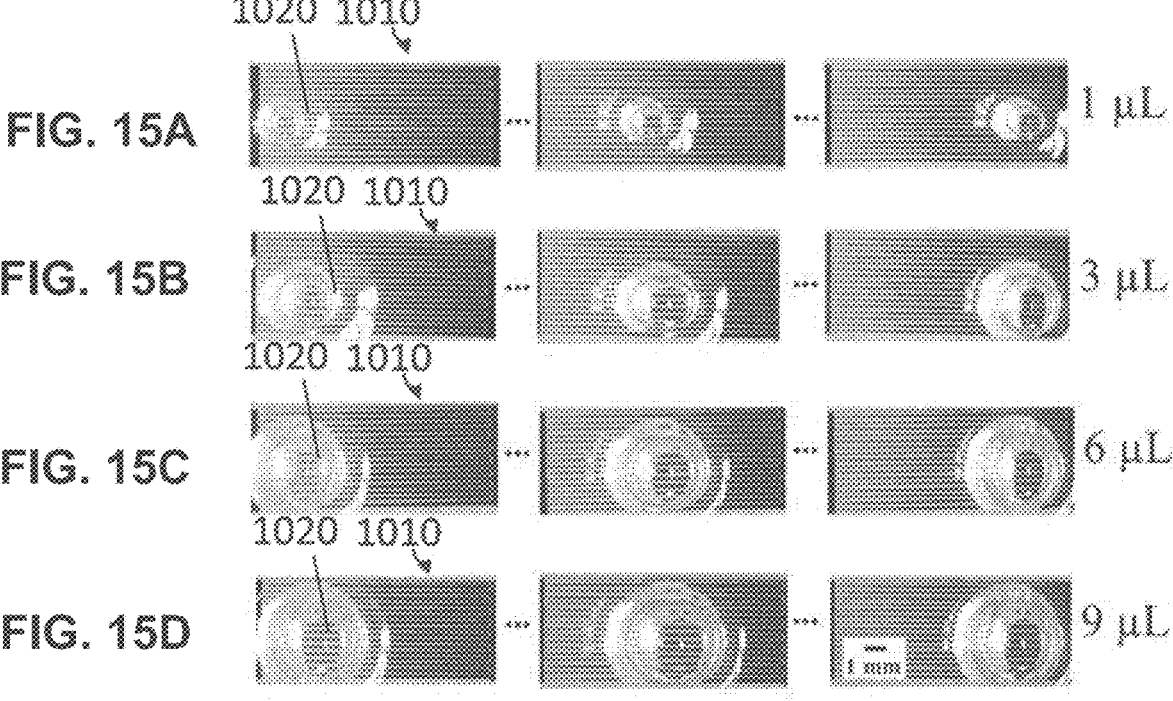
FIGS. 15A to 15D each show three chronologically progressive views of a device according to an embodiment of the present disclosure with a droplet present on its top surface, where

FIG. 14 shows such a device 1010 with a droplet 1020 disposed on the top surface 1015*a*. Whilst the voltage source is not shown explicitly in FIG. 14, one electrode of the interdigitated electrode pair is shown as being connected to ground ("GND") and the other electrode 1012 of the interdigitated electrode pair is shown as being connected to a signal ("SIGNAL"). Connection to ground and a signal provides a voltage to the interdigitated electrode pair that creates an electric field that may manipulate the droplet 1020 disposed on the top surface 1015*a*.

FIGS. 15A to 15D show images of droplets 1020 being manipulated by a device of the type described above with reference to FIGS. 11 to 14. In FIGS. 15A, 15B, 15C and 15D, the droplet 1020 has a volume of 1 μL, 3 μL, 6 μL and 9 μL, respectively. In the three images of each of FIGS. 15A to 15D, it is shown that the droplet 1020 is caused to move from left to right across the device 1010. More specifically, the droplet 1020 moves along a direction that is parallel to the longitudinal axes 1025 of the electrode branches and in a direction along which the spacing 1027 decreases.

Figures 16A, 16B:
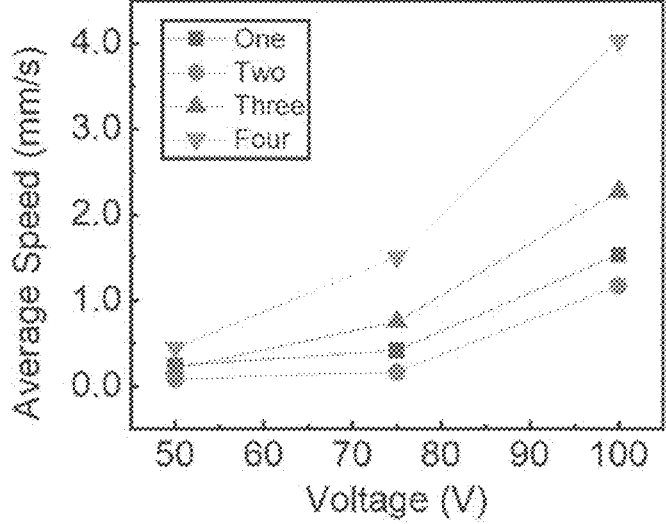
FIG. 16A shows a graph of measured droplet speed at various voltages for devices according to the patterns defined in the table of FIG. 16B.

FIG. 16A shows a graph indicating the average speed of a droplet travelling along the top surface of a device of the type described above with reference to FIGS. 11 to 15D at different voltages. The four series ("One", "Two", "Three", and "Four") relate to four different arrangements of electrodes that are defined in the table shown in FIG. 16B. In FIG. 16B, the four arrangements are defined according to the lengths of the electrodes (i.e. the lengths along the directions parallel to the respective longitudinal axes 1025), minimum electrode gap (i.e. minimum spacing 1027), and maximum electrode gap (i.e. maximum spacing 1027). As seen from FIG. 16A, reducing the lengths of the electrodes and reducing the maximum electrode gap results in greater average speed.

Figure 17:
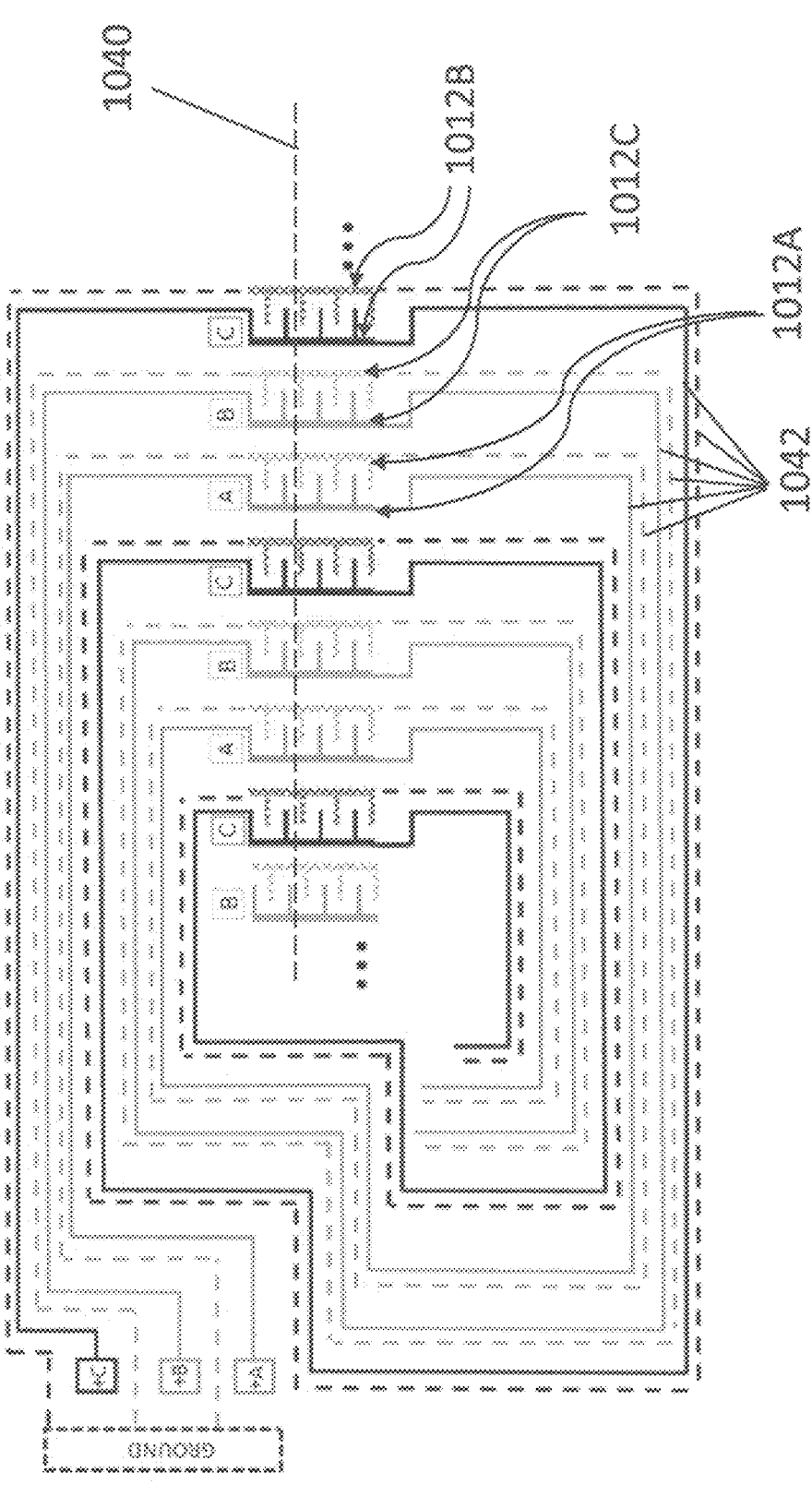
FIG. 17 shows a device in accordance with certain embodiments of the present disclosure.

FIG. 17 shows an arrangement of electrodes that may be incorporated into a device in accordance with an embodiment of the present disclosure. In the arrangement of FIG. 7, three series A, B and C of interdigitated electrode pairs 1012A, 1012B, 1012C are provided. In each series, each electrode 1012A, 1012B, 1012C of each pair is connected to an electrode 1012A, 1012B, 1012C of an adjacent pair in the same series A, B, C by an electrical path 1042.

All of the interdigitated electrodes shown in FIG. 17 form part of a single group of interdigitated electrode pairs, wherein the group has a longitudinal axis 1040. The interdigitated electrode pairs of the group are arranged along the longitudinal axis 1040 such that, along the longitudinal axis 1040, no two adjacent pairs are from a single one of the three series A, B, C, and no pair is adjacent to two other pairs from a single one of the three series A, B, C. In the embodiment shown in FIG. 17, the order of the series of adjacent pairs along the longitudinal axis 1040 is: { . . . B, C, A, B, C, A, B, C, . . . }.

The pairs of electrodes 1012A, 1012B, 1012C are energisable by application of a voltage across the two electrodes 1012A, 1012B, 1012C of each pair. In the embodiment shown in FIG. 17, each series A, B, C is energisable by applying a signal of +A, +B, +C, respectively, to one electrode of each pair of the respective series and connecting the other electrode of each pair to ground. In this embodiment, each series A, B, C is connected to a common ground terminal. In alternative embodiments, unique terminals may be provided. In the embodiment of FIG. 17, the series may be energised individually and sequentially (e.g. C, B, A, C, B, A, . . . ) in order to cause a droplet to move along the longitudinal axis 1040. This specific arrangement utilises only four terminals (including the common ground) for three independently controllable series A, B, C, thus removing the design requirement to fabricate many electrical contact points.

In alternative embodiments, more than three series may be provided, where the additional series may or may not share a common ground terminal with other series. In some embodiments, the electrode pairs may be arranged along the longitudinal axes of multiple groups of electrode pairs.

Arranging the electrode pairs in series and groups, as in the embodiment shown in FIG. 17, may simplify the manufacturing process of the device. For example, such an arrangement may eliminate the requirement for wire bonding or other costly or time-consuming electrical connection techniques. Arranging the interdigitated electrode pairs and the electrical paths 1042 in a common plane further simplifies the manufacture of the device 1010. Through this arrangement, the three or more series of interdigitated electrode pairs are selectively and independently energisable to produce an electric field at a top surface of the dielectric layer so that a substance on the top surface may be manipulated by the electric field. As few as three interdigitated electrode pairs may be used (and controlled) to cause a substance to traverse the entire top surface of the dielectric layer along longitudinal axis 1040. Thus, the complexity of the manufacturing process and the control electronics may be reduced in comparison with alternative arrangements.

The distance between the electrodes 1012A, 1012B, 1012C of each electrode pair may vary in accordance with the embodiments described above with reference to FIGS. 11 to 16B. In other embodiments, the electrodes 1012A, 1012B, 1012C of each pair may be separated by a distance that does not vary along a direction that is parallel to the longitudinal axes of the branches of the electrodes 1012A, 1012B, 1012C (which is also parallel to the longitudinal axis 1040 of the group of electrode pairs).

Figure 18A:
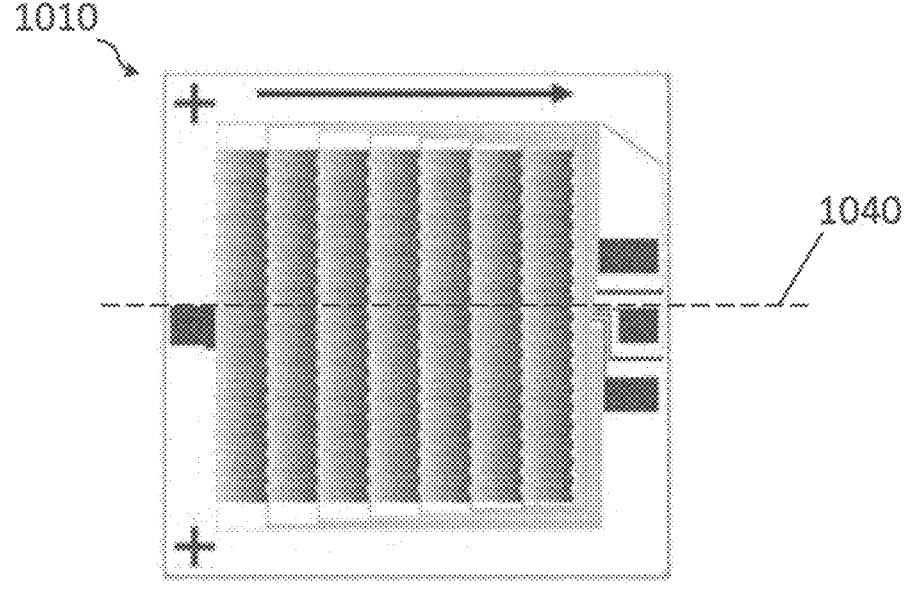
FIG. 18A shows a device in accordance with an alternative embodiment of the present disclosure.

FIG. 18A shows a device 1010 made in accordance with the schematic diagram of FIG. 17, where the distance between the electrodes of each electrode pair varies in accordance with the embodiments described above with reference to FIGS. 11 to 16B. The interdigitated electrode pairs are arranged into a single group that has a longitudinal axis 1040. When the series of interdigitated electrode pairs are energised sequentially a substance on the top surface of the device is caused to move along the direction indicated by the arrow in FIG. 18A, which is parallel to the longitudinal axis 1040.

Figure 18B:
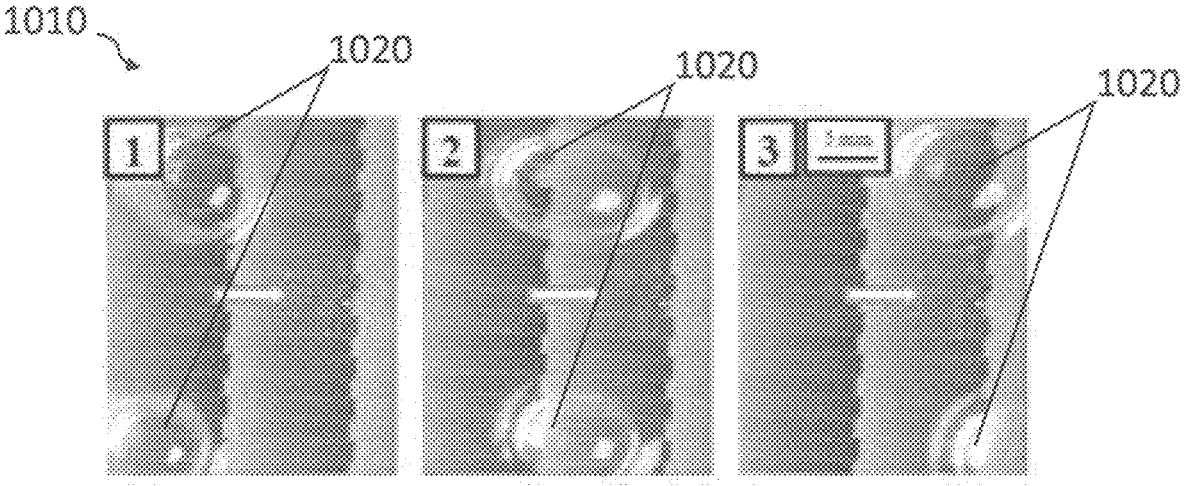
FIG. 18B shows three consecutive images showing the progression of droplets across the device of FIG. 18A.

FIG. 18B shows three images (insets 1 to 3) that show two droplets being caused to move along the top surface of the device 1010 of FIG. 18A along the direction indicated by the arrow.

Figure 19A:
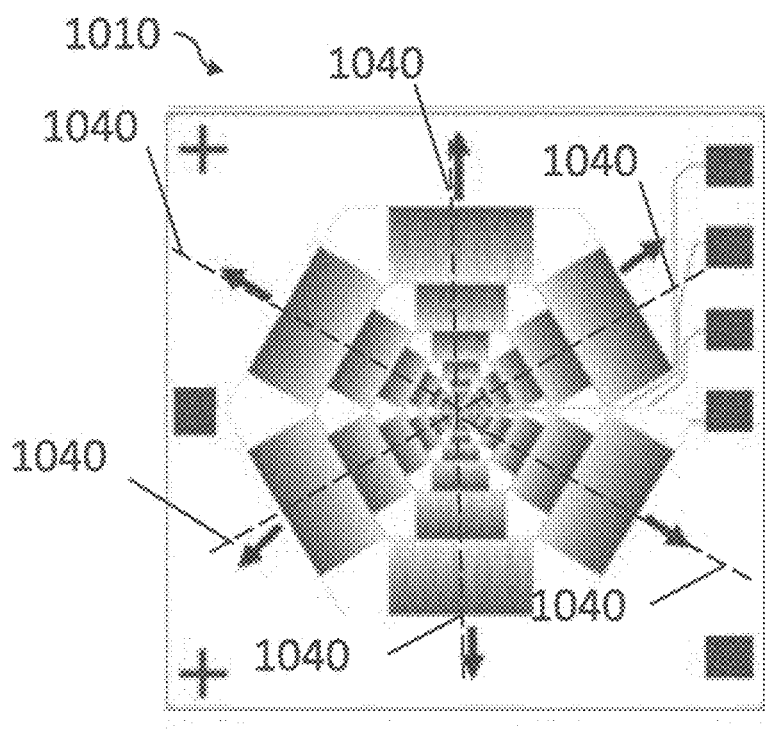
FIG. 19A shows a device in accordance with an alternative embodiment of the present disclosure.

FIG. 19A shows a device 1010 made in accordance with the schematic diagram of FIG. 17, where the distance between the electrodes of each electrode pair varies in accordance with the embodiments described above with reference to FIGS. 11 to 16B. The interdigitated electrode pairs are arranged into six groups that each have a longitudinal axis 1040. Each group radiates from a common central point. Each interdigitated electrode pair collectively covers an area that may be termed an interdigitated electrode pair array. The size of the interdigitated electrode pair arrays increases along a radially outward direction along the longitudinal axes 1040. That is, each consecutive interdigitated electrode pair array along each longitudinal axis 1040 increases in both length and width relative to the previous array. When the series of interdigitated electrode pairs are energised sequentially a substance on the top surface of the device is caused to move along one of the directions indicated by the arrows in FIG. 19A, which are each parallel to the respective longitudinal axis 1040. The surface area of the blank gaps between electrode arrays increases in the radially outward direction in accordance with the golden ratio. Droplets in the radially inner region of the device are caused to be continually transported radially outwardly to merge and form larger droplets. Larger droplets are less likely to become isolated on one of the blank gaps, so the impact of the increasing blank gaps is offset by the reducing likelihood of a droplet moving to an area where it is no longer being manipulated by the electrodes.

Figure 19B:
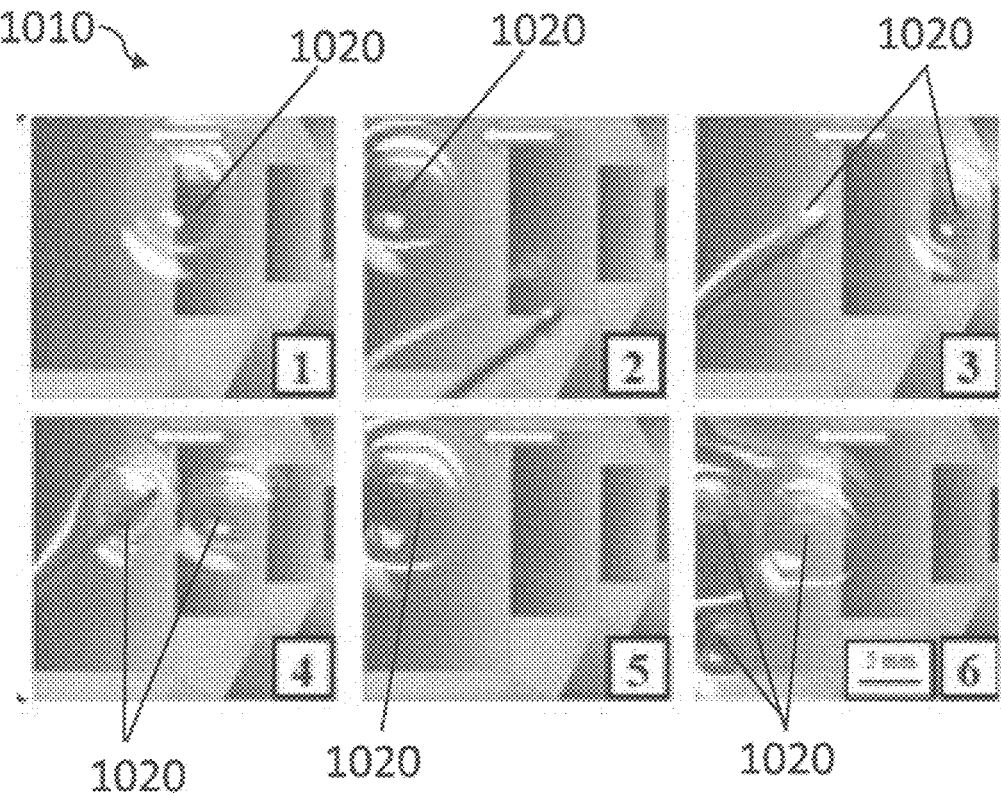
FIG. 19B shows six consecutive images showing the progression of droplets across the device of FIG. 19A.

FIG. 19B shows six images (insets 1 to 6) that show droplets being caused to move along the top surface of the device 1010 of FIG. 19A along the direction indicated by the arrow.

The embodiment of FIGS. 19A and 19B provides radial displacement of a substance and may be useful in applications where radial-symmetric droplet motion is desired, e.g. for the cleaning of solar panels or electronic sensors.

Figure 20A:
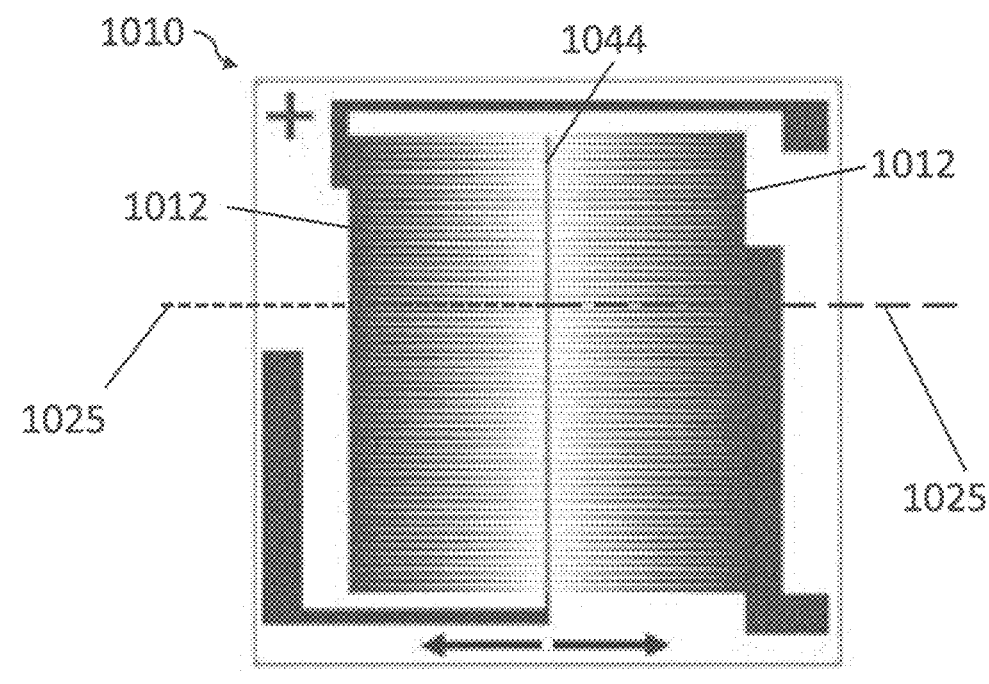
FIG. 20A shows a device in accordance with an alternative embodiment of the present disclosure.

FIG. 20A shows a device 1010 according to an embodiment of the disclosure in which two pairs of interdigitated electrodes 1012 are provided and one electrode of each pair is connected to a common terminal. Thus the two pairs of interdigitated electrodes require only three terminals to be operated. The two pairs of interdigitated electrodes are arranged so that the electrodes are substantially identical about a centre line 1044. The spacing between adjacent electrodes of each pair of interdigitated electrodes decreases in a direction away from the centre line 1044.

As such, a droplet on the top surface of the device 1010 of FIG. 20A would be caused to move along one of the directions indicated in FIG. 10A, depending on which side of the centre line 1044 it was initially disposed. Both pairs of interdigitated electrodes may be permanently energised, thus negating the requirement for any control system for switching interdigitated electrode pairs on or off.

Figure 20B:
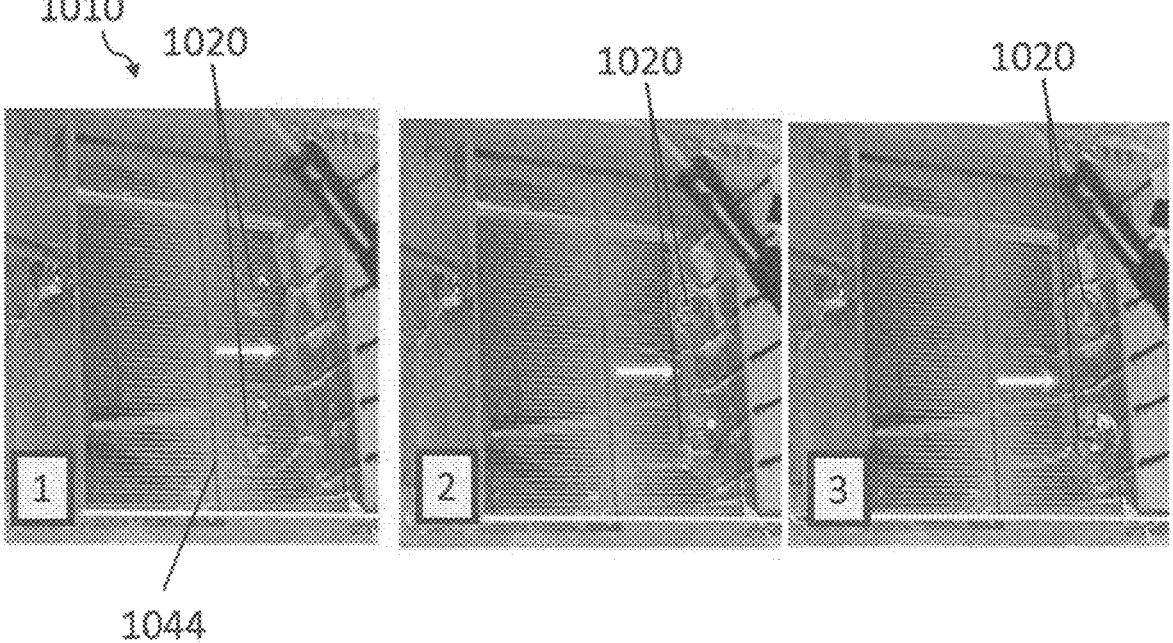
FIG. 20B shows three consecutive images showing the progression of droplets across the device of FIG. 20A.

FIG. 20B shows three images (insets 1 to 3) that show two droplets being caused to move along the top surface of the device 1010 of FIG. 20A along the direction indicated by the arrow.

FIG. 21 shows a schematic overview of a plurality of electrodes 1012 of a device 1010 according to an embodiment of the present disclosure. Each electrode 1012 comprises a root 1012a, a plurality of branches 1012b that each extend from the root 1012a. Each branch 1012b comprises a main branch 1012c and a plurality of sub-branches 1012d that each extend from each of the main branches 1012c. Each electrode 1012 additionally includes an electrode pad 1012e (or terminal) that is greater in area relative to adjacent areas of the respective electrode 1012. The electrode pad 1012e may be used to electrically connect the electrode to a source of electrical energy so as to apply a potential difference. In the non-limiting embodiment shown in FIG. 21, some electrodes 1012 (every alternate one) shares a common electrode pad 1012e. In alternative embodiments, each electrode 1012 may comprise an individual electrode pad 1012e. Also in the non-limiting embodiment shown in FIG. 21, certain ones of the electrodes 1012 include branches 1012b that extend from opposite sides of the respective root 1012a. In the embodiment shown, the branches 1012b extending from one side of the respective root 1012a are of a different length to the branches 1012b extending from the other side of the root 1012a. In alternative embodiments, branches 1012b extending from both sides of a root 1012a may be of substantially equal length.

The electrodes 1012 are arranged in pairs so that the plurality of branches 1012b of a first electrode 1012 are interdigitated with the plurality of branches 1012b of a second, adjacent electrode 1012 of the pair. Thus, the two adjacent electrodes 1012 form an interdigitated electrode pair. As noted above, in some embodiments, a single electrode pad 1012e may serve as a common electrode to two or more of the electrodes 1012 so that not all pairs comprise unique electrode pads 1012e.

The non-limiting embodiment of FIG. 21 additionally shows an arrangement in which the root 1012a of the first electrode 1012 of each interdigitated electrode pair is substantially parallel to the root 1012a of the second electrode 1012 of the interdigitated electrode pair. Furthermore, each of the plurality of branches 1012b extends substantially perpendicularly from the respective root 1012a along a longitudinal axis 1025. Each of the plurality of sub-branches 1012d extends from the respective plurality of main branches 1012c at an inclined angle (i.e. an angle that is not 90°). In the embodiment of FIG. 21, the sub-branches 1012d all extend from their respective main branch 1012c in the same direction relative to the longitudinal axes 1025 of the branches 1012b irrespective of which of the electrodes of the pair they belong.

FIGS. 22A to 22D each show a partial view of alternative electrodes of a device 1010 according to an embodiment of the disclosure. FIG. 22A shows an arrangement that is similar to the embodiment of v 21, but wherein the spacing between adjacent sub-branches 1012d (of a given branch 1012b) is smaller relative to the respective spacings shown in FIG. 21.

In certain embodiments, the plurality of sub-branches 1012d of each of the first and second electrodes 1012 of each interdigitated electrode pair comprise a first set of sub-branches and a second set of sub-branches, where the first set of sub-branches is not identical to the second set of sub-branches. For example, in the embodiment shown in FIG. 22B, a first set of sub-branches 1012d comprise longer sub-branches 1012d than a second set of sub-branches and individual ones of the first set are alternately arranged with individual ones of the second set. For the avoidance of doubt, a "longer" sub-branch 1012d extends further from the respective main branch 1012c relative to a "shorter" sub-branch 1012d.

FIG. 22C shows an embodiment in which the sub-branches 1012d are substantially wedge-shaped (i.e. generally triangular) and extend from the respective main branches 1012c to form a saw-tooth profile.

In the embodiment of FIG. 22D, the plurality of sub-branches 1012d extend substantially perpendicularly from the respective plurality of main branches 1012c. Moreover, each of the plurality of sub-branches 1012d of the first electrode of each interdigitated electrode pair has a longitudinal axis that is not coincident with a longitudinal axis of each of the plurality of sub-branches 1012d of the second electrode of the interdigitated electrode pair. To state this another way, the plurality of sub-branches 1012d of the first electrode of each interdigitated electrode pair are not aligned with the plurality of sub-branches 1012d of the second electrode of the interdigitated electrode pair along an axis that is perpendicular to the longitudinal axes 1025 along which the branches 1012b extend.

In each of the embodiments of FIGS. 21 and 22A to 22D, the spacing between adjacent branches 1012b of the interdigitated electrode pairs varies along a direction parallel to that respective longitudinal axis 1025 of each branch 1012b due to the geometries of the main branches 1012c and the sub-branches 1012d. The geometrical arrangements of the electrodes shown in FIGS. 21 and 22A to 22D serve to enhance the local electric fields generated by the electrodes 1012. As a result, lower operating voltages may be required to produce the desired electric field at the top surface of the device 1010.

Figure 23A:
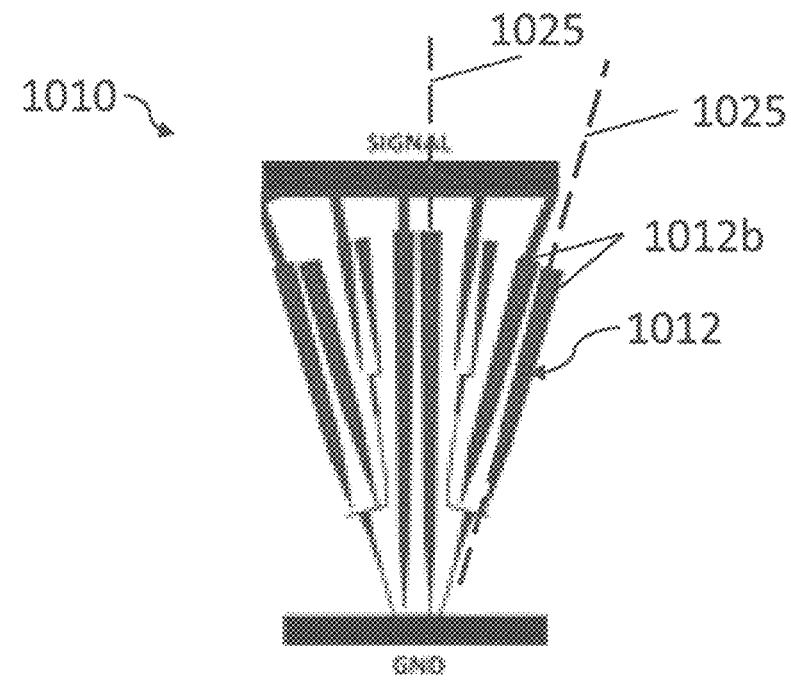
FIG. 23A shows a device in accordance with an alternative embodiment of the present disclosure.

FIG. 23A shows an alternative arrangement of a pair of electrodes 1012 of a device 1010 according to an embodiment of the present disclosure. Whilst not all longitudinal axes 1025 are indicated in FIG. 23A, it can be seen that not all longitudinal axes 1025 of the electrode branches are parallel to one another. Instead, some longitudinal axes 1025 are inclined relative to others. Pairs of adjacent electrode branches 1012b (from different ones of the pair of electrodes 1012) have longitudinal axes 1025 that are parallel to one another, whilst an adjacent pair of adjacent electrode branches 1012b have longitudinal axes 1025 that are parallel to one another, but that are inclined with respect to the adjacent pair of adjacent electrode branches 1012b. Some of the electrode branches 1012b additionally vary in length relative to other electrode branches 1012b in order to be accommodated by surrounding electrode branches 1012b. As with certain embodiments described above (e.g. the embodiment described with reference to FIG. 12), adjacent branches 1012B of the interdigitated electrode pair are spaced from one another in a direction that is perpendicular to the respective longitudinal axis 1025 of one of the adjacent branches, and the spacing varies along a direction parallel to that respective longitudinal axis 1025.

Figure 23B:
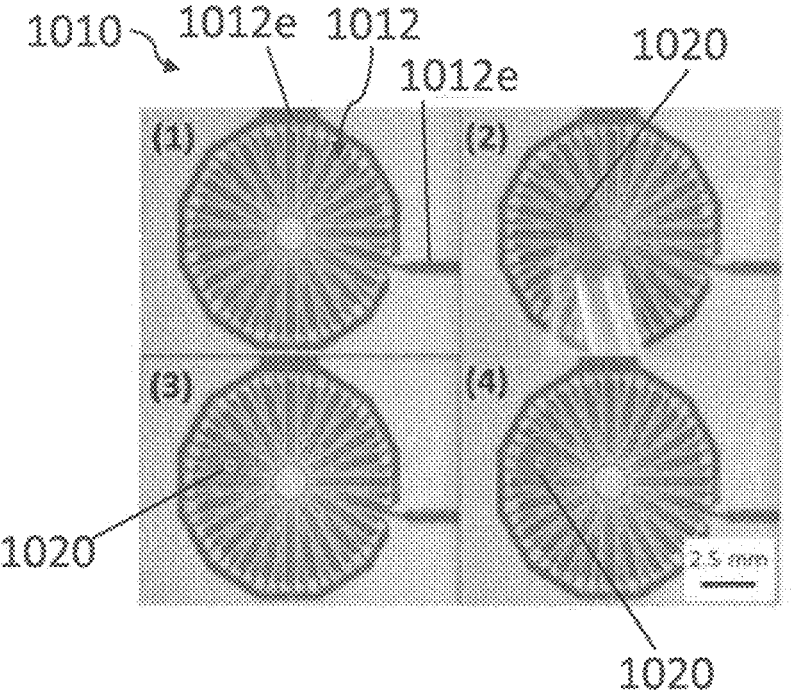
FIG. 23B shows four consecutive images showing the progression of droplets across a device in accordance with an alternative embodiment of the present disclosure.

The arrangement of electrodes 1012 shown in FIG. 23A may be repeated to form a circular device 1010 such as the one shown in FIG. 23B. FIG. 23B shows a device 1010 having a pair of electrodes arranged circularly around a common point. Since there are only two electrodes 1012 (albeit with many branches), only two electrode pads (terminals) 1012e are required. As such, the two electrodes 1012 may be permanently energised such that no control system (or at least a simpler control system) may be required. Insets 1 to 4 show the effect of the device 1010 of FIG. 23A on a droplet 1020 of water that contains contaminants (inset 1 shows no droplet 1020 present). Insets 2 to 3 show that the droplet 1020 is progressively caused to move radially outward from the centre of the device 1010.

Figure 25:
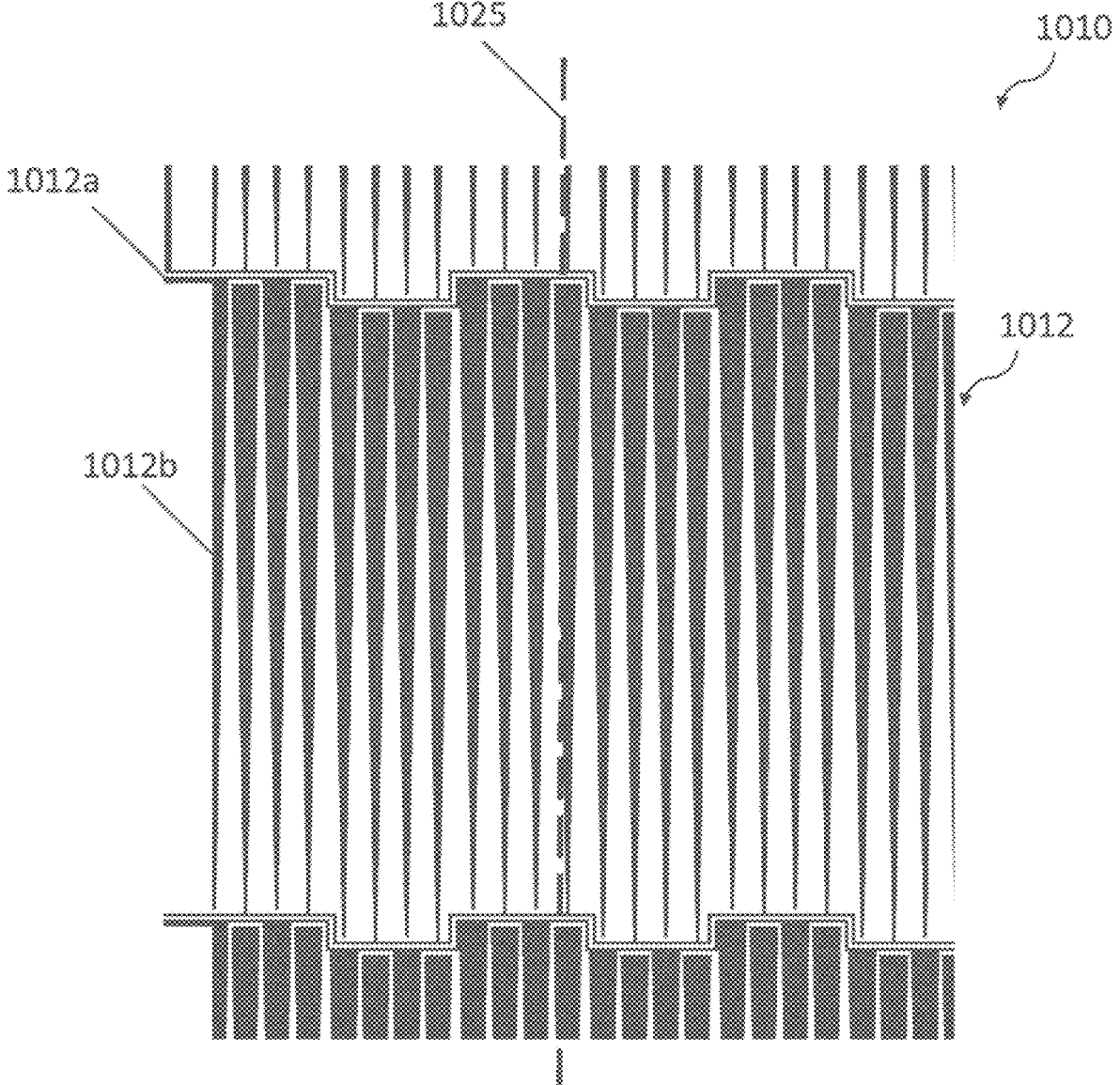
FIG. 25 shows a device in accordance with an alternative embodiment of the present disclosure.

A device 1010 in accordance with an alternative embodiment of the present disclosure is shown in FIG. 25. The roots 1012a of the electrodes follow a stepped profile such that the branches 1012b extend by varying amounts relative to one another. As a result, along a direction that is perpendicular to the longitudinal axis 1025 of the branches 1012b, the branches 1012b of successive electrodes 1012 are intersected. This overlap may facilitate improved actuation of the device 1010 since a droplet may be moved to the area of overlap when one pair of electrodes is energised, and may subsequently be manipulated by the next pair of electrodes when they are actuated and the previous pair of electrodes is switched off.

In any embodiment, the electrodes may be energised with either an AC signal or a DC signal. Certain applications of the disclosure require (or perform more effectively with) an AC signal. In certain embodiments, it is found that AC signals provide a deeper penetration of electric field into a substance disposed on the top surface of the device, thus enhancing the ability of the device to manipulate that substance. The use of DC signals, however, offers the ability to utilise simpler control system.

In embodiments utilising AC signals, the frequency of the signal may be selectable and/or continuously controllable. The frequency of the signal may be selected based on the composition of the likely substance that the device will be used to manipulate. For example, a particular frequency or frequency range may be selected if the substance to be manipulated is a water droplet. A different frequency or frequency range may be selected if the substance to be manipulated is a droplet of blood, e.g. if the device formed part of a medical device that required the movement of blood droplets. In certain embodiments, the device may utilise several frequencies, e.g. in succession. Such embodiments may be effective if the composition of the substance to be manipulated is unknown, where the substance is manipulated as desired by one of the several frequencies. In certain embodiments, the frequencies used may be generated randomly, e.g. from a given subset. In certain non-limiting embodiments, an AC voltage having a frequency 250 kHz or less may be used (e.g. for dielectrowetting applications). In other embodiments, an AC voltage between 0.1 kHz and 2.5 kHz may be used (e.g. for electrowetting applications. The optimum frequency for a particular liquid may be determined by preliminary experimentation. For example, an optimum frequency of between 0.1 kHz and 2.5 kHz was found to be most suitable for manipulating rain droplets with contaminants such as mud, dust, etc.

Figure 24:
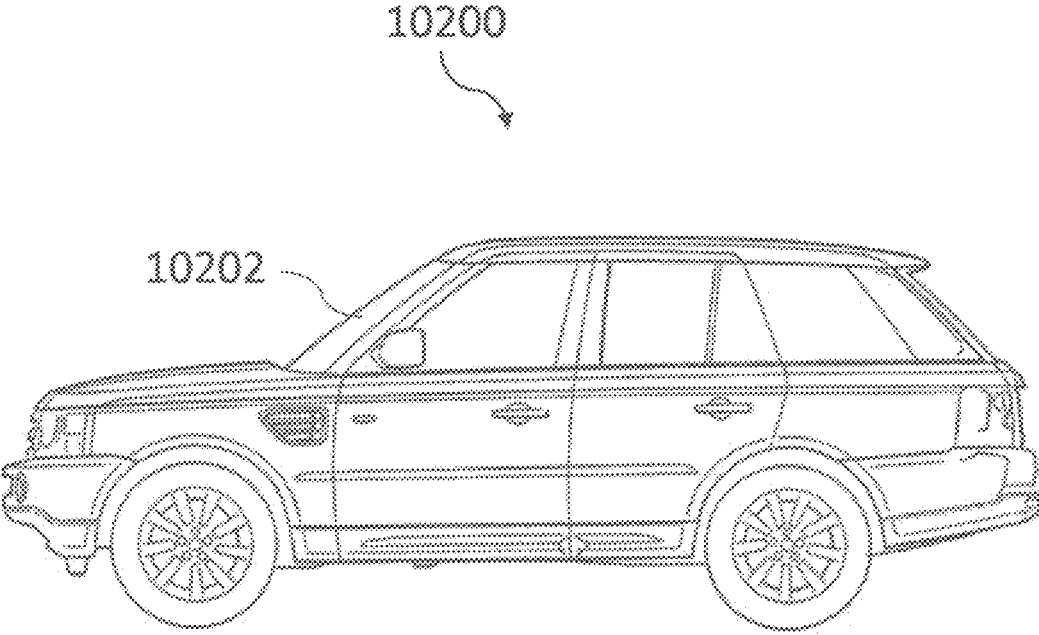
FIG. 24 shows a vehicle according to an embodiment of the present disclosure.

FIG. 24 shows a vehicle 10200 according to an embodiment of the present disclosure. The vehicle 10200 may incorporate any of the devices described above and/or any component that is controlled according to the methods described above. For example, a windscreen 10202 of the vehicle 10200 may include any of the devices described above such that liquid droplets may be caused to move to a specified region of the windscreen (e.g. an edge). Devices according to embodiments of the disclosure might be beneficial when disposed on or in the areas of the windscreen that are not wiped by the windscreen wipers of the vehicle. In alternative embodiments, other components such as substantially translucent materials of the vehicle may incorporate the above-described devices and/or be controlled according to the above-described methods. Devices according to embodiments of the disclosure might also be incorporated into larger devices and components such as sensors, cameras, or optical components of such devices.

In alternative embodiments, the device described above may be used to manipulate substances in a manner other than that depicted in FIGS. 15A to 15D, for example (i.e. other than transporting liquid droplets along the top surface). For example the substance that is to be manipulated may be a solid (e.g. ice). Devices and/or methods according to embodiments of the present disclosure may be used to cause melting or sublimation of the solid substance. Such an operation may be achieved by selecting the frequency at which the voltage is applied to the electrode pairs to be one that causes heating of the substance. Alternatively, devices and/or methods according to embodiments of the present disclosure may be used to spread a liquid substance (that may initially, for example, be in droplet form) over the top surface.

It will be appreciated that embodiments of the present disclosure can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present disclosure. Accordingly, certain embodiments provide a program comprising code for implementing a system or method and a machine readable storage storing such a program. Still further, embodiments of the present disclosure may be conveyed electronically via any medium such as a communication signal carried over a wired or wireless connection and embodiments suitably encompass the same.

All of the features disclosed in this specification, and/or all of the steps of any method or process so disclosed, may be combined in any combination, except combinations where at least some of such features and/or steps are mutually exclusive.

Each feature disclosed in this specification, may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

The invention claimed is:

1. A device for manipulating a substance, the device comprising:

at least three series of interdigitated electrode pairs, wherein each electrode of each pair is connected to an electrode in an adjacent pair in the respective series by an electrical path; and a dielectric layer disposed on the at least three series of interdigitated electrode pairs, the dielectric layer comprising one or more sub layers;

wherein the at least three series of interdigitated electrode pairs are selectively and independently energisable to produce an electric field at a top surface of the dielectric layer so that the substance on the top surface may be manipulated by the electric field;

the device further comprising one or more groups of the interdigitated electrode pairs, each group having a longitudinal axis, wherein in each group the respective interdigitated electrode pairs are arranged along the respective longitudinal axis such that along the respective longitudinal axis no two adjacent pairs are from a single one of the at least three series, and no pair is adjacent to two other pairs from a single one of the at least three series.

2. The device according to claim 1, wherein the at least three series of interdigitated electrode pairs consists of only three series of interdigitated electrode pairs.

3. The device according to claim 1, comprising a plurality of the one or more groups wherein longitudinal axes of at least some of the plurality of groups radiate out from a common point.

4. The device according to claim 3, wherein consecutive interdigitated electrode pairs along each longitudinal axis increase in size in a direction away from the common point.

5. The device according to claim 4, wherein lengths of the consecutive interdigitated electrode pairs increase in size in the direction away from the common point.

6. The device according to claim 4, wherein widths of the consecutive interdigitated electrode pairs increase in size in the direction away from the common point.

7. The device according to claim 1, wherein all of the interdigitated electrode pairs and electrical paths are in the same plane as one another.

8. The device according to claim 1, wherein one electrode of each pair is connected to a common ground terminal.

9. The device according to claim 1, wherein each electrode of each of the one or more groups of the interdigitated electrode pairs comprises a root and a plurality of branches that each extend from the root along a respective longitudinal axis, wherein the plurality of branches of one electrode of a pair are interdigitated with the plurality of branches of the other electrode of the pair; wherein adjacent branches of each of the interdigitated electrode pairs are spaced from one another in a direction that is perpendicular to the respective longitudinal axis of one of the adjacent branches, and spacing varies along a direction parallel to that respective longitudinal axis.

10. The device according to claim 9, wherein the spacing decreases along the direction parallel to the respective longitudinal axis.

11. The device according to claim 10, wherein the spacing decreases at a substantially constant rate along the direction parallel to the respective longitudinal axis.

12. The device according to claim 1, wherein the dielectric layer has a thickness and composition such that the electric field at the top surface of the dielectric layer is at least $2 \times 10^6$ V/m when the interdigitated electrode pairs are selectively energized by a voltage of 100 V or less, 50 V or less, or 30 V or less.

13. The device according to claim 1, wherein the dielectric layer has a thickness and composition such that the electric field at the top surface of the dielectric layer is at least $1 \times 10^7$ V/m when the at least three series of interdigitated electrode pairs are selectively energized by a voltage of 100 V or less, 50 V or less, or 30 V or less.

14. The device according to claim 1, wherein the dielectric layer includes one of the one or more sub layers comprising photosensitive epoxy resin.

15. The device according to claim 14, wherein the photosensitive epoxy resin comprises SU8 photoresist.

16. The device according to claim 1, wherein the dielectric layer includes one of the one or more sub layers comprising a hydrophobic material.

17. The device according to claim 16, wherein the hydrophobic material comprises a hydrophobic self-assembled monolayer.

18. A vehicle comprising the device according to claim 1.

19. An assembly comprising a substantially translucent material having the device according to claim 1 embedded therein or affixed thereto.

20. A method of using the device according to claim 1, comprising selectively and independently energising the at least three series of interdigitated electrode pairs to produce the electric field at the top surface of the dielectric layer so that the substance on the top surface may be manipulated by the electric field.

* * * * *